(12) United States Patent
Hope et al.

(10) Patent No.: US 10,825,338 B2
(45) Date of Patent: *Nov. 3, 2020

(54) HANDHELD ELECTRONIC DEVICES WITH REMOTE CONTROL FUNCTIONALITY AND GESTURE RECOGNITION

(71) Applicant: Apple Inc., Cupertino, CA (US)

(72) Inventors: Eric James Hope, Cupertino, CA (US); Alan Cannistraro, San Francisco, CA (US); Policarpo Wood, Cupertino, CA (US); William Bull, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,103

(22) Filed: Sep. 14, 2017

(65) Prior Publication Data

US 2018/0005517 A1 Jan. 4, 2018

Related U.S. Application Data

(63) Continuation of application No. 11/955,382, filed on Dec. 12, 2007, now Pat. No. 9,767,681.

(51) Int. Cl.
*G08C 17/02* (2006.01)
*G06F 3/0482* (2013.01)
(Continued)

(52) U.S. Cl.
CPC ............ *G08C 17/02* (2013.01); *G06F 3/0482* (2013.01); *G06F 3/0485* (2013.01);
(Continued)

(58) Field of Classification Search
CPC ... G08C 17/02; G08C 2201/32; G06F 3/0482; G06F 3/04847; G06F 3/0485;
(Continued)

(56) References Cited

U.S. PATENT DOCUMENTS 5,652,849 A 7/1997 Conway et al.
6,396,523 B1 5/2002 Segal et al.
(Continued)

FOREIGN PATENT DOCUMENTS

WO WO 2005078676 A2 * 8/2005 ............. G08C 17/00

OTHER PUBLICATIONS

"UPnP Media Controller" [Online]. Cidero [retrieved on Dec. 12, 2007]: <URL: www.cidero.com/mediacontroller.html>.
(Continued)

*Primary Examiner* — Amine Benlagsir
(74) *Attorney, Agent, or Firm* — Treyz Law Group, P.C.; G. Victor Treyz; David K. Cole

(57) ABSTRACT

Handheld electronic devices are provided that have remote control functionality and gesture recognition features. The handheld electronic device may have remote control functionality in addition to cellular telephone, music player, or handheld computer functionality. The handheld electronic devices may have a touch sensitive display screen. The handheld electronic devices may recognize gestures performed by a user on the touch sensitive display screen. The handheld electronic devices may generate remote control signals from gestures that the handheld electronic device may recognize. A media system may receive the remote control signals and may take appropriate action. The touch sensitive display screen may be used to present the user with information about the media system such as the current volume.

19 Claims, 20 Drawing Sheets

(51) Int. Cl.

| | |
|---|---|
| *G06F 3/0484* | (2013.01) |
| *G06F 3/0485* | (2013.01) |
| *G06F 3/0488* | (2013.01) |
| *H04M 1/725* | (2006.01) |
| *H04N 5/765* | (2006.01) |
| *H04N 21/422* | (2011.01) |
| *H04N 5/775* | (2006.01) |
| *H04N 5/781* | (2006.01) |
| *H04N 5/85* | (2006.01) |
| *H04N 5/907* | (2006.01) |
| *H04W 88/02* | (2009.01) |

(52) U.S. Cl.
CPC ...... *G06F 3/04847* (2013.01); *G06F 3/04883* (2013.01); *H04M 1/72533* (2013.01); *H04N 5/765* (2013.01); *H04N 21/422* (2013.01); *H04N 21/42204* (2013.01); *G08C 2201/32* (2013.01); *H04M 2250/22* (2013.01); *H04N 5/775* (2013.01); *H04N 5/781* (2013.01); *H04N 5/85* (2013.01); *H04N 5/907* (2013.01); *H04N 21/4222* (2013.01); *H04N 21/42224* (2013.01); *H04W 88/02* (2013.01)

(58) Field of Classification Search
CPC ........... G06F 3/04883; H04M 1/72533; H04N 5/4403; H04N 21/422
See application file for complete search history.

(56) References Cited

U.S. PATENT DOCUMENTS

| | | | |
|---|---|---|---|
| 6,633,281 B2 | 10/2003 | Lin et al. | |
| 6,765,557 B1 | 7/2004 | Segal et al. | |
| 6,791,467 B1* | 9/2004 | Ben-Ze'ev | G08C 19/28 340/12.25 |
| 6,914,551 B2 | 7/2005 | Vidal | |
| 7,230,563 B2 | 6/2007 | Vidal | |
| 7,535,465 B2* | 5/2009 | Morse | G11B 27/105 345/204 |
| 2002/0097229 A1* | 7/2002 | Rose | G06F 1/1626 345/173 |
| 2005/0168372 A1 | 8/2005 | Hollemans | |
| 2006/0026536 A1 | 2/2006 | Hotelling et al. | |
| 2008/0068506 A1 | 3/2008 | Urisu | |
| 2008/0178224 A1 | 7/2008 | Laude et al. | |
| 2011/0018817 A1 | 1/2011 | Kryze et al. | |

OTHER PUBLICATIONS

Kelly et a, "Designing RF Remote Controls for DTV Products" [Online]. Digital TV Design Line. [retrived on Nov. 7, 2007]: <URL: www.digitaltvdesignline.com/showArticle.html?printableArticle=true&articleId=202100019>.

"Phillips and Samsung spearhead new CEA-2014 (WEb4CE) HTML-based remote user interfaces for UPnP home-networked applications and Internet services" [Online]. HiddenWires [retrieved on Nov. 7, 2007]: <URL:hiddenwires.co.uk/resourcenews2006/new20060223-12.html.

* cited by examiner

HANDHELD ELECTRONIC DEVICES WITH REMOTE CONTROL FUNCTIONALITY AND GESTURE RECOGNITION

This application is a continuation of U.S. patent application Ser. No. 11/955,382, filed Dec. 12, 2007, which is hereby incorporated by reference in its entirety.

BACKGROUND

This invention relates to handheld electronic devices, and more particularly, to handheld electronic devices that have remote control features and gesture recognition.

Remote controls are commonly used for controlling televisions, set-top boxes, stereo receivers, and other consumer electronic devices. Remote controls have also been used to control appliances such as lights, window shades, and fireplaces.

Because of the wide variety of devices that use remote controls, universal remote controls have been developed. A universal remote control can be programmed to control more than one device. For example, a universal remote control may be configured to control both a television and a set-top box.

Conventional universal remote controls have a number of limitations. Conventional universal remote controls typically have a large number of buttons. It is therefore often difficult for a user to operate a conventional universal remote control device without focusing on the universal remote control device. This may lead to frustration as a user is forced to switch focus between pressing the correct button on the remote control and viewing information on a television or other device that is being controlled by the remote control.

A conventional universal remote control device must also generally be left in the vicinity of the equipment it is used to operate. This is because conventional remote controls are typically dedicated to performing remote control functions of a particular device.

It would therefore be desirable to be able to provide a way in which to overcome the limitations of conventional remote controls.

SUMMARY

In accordance with an embodiment of the present invention, a handheld electronic device with remote control functionality is provided. The handheld electronic device may have the ability to perform gesture recognition operations. The handheld electronic device may have remote control functionality as well as cellular telephone, music player, or handheld computer functionality. One or more touch sensitive displays may be provided on the device. For example, the device may have a touch screen that occupies most or all of the front face of the device. Wireless communications circuitry may be used to support cellular telephone calls, wireless data services (e.g., 3G services), local wireless links (e.g., Wi-Fi® or Bluetooth® links), and other wireless functions. During remote control operations, the wireless communications circuitry may be used to convey remote control commands to a media system. Information from the media system may also be conveyed wirelessly to the handheld electronic device.

With one suitable arrangement, the touch sensitive display screen may recognize gestures that a user makes on the touch sensitive display screen. Recognized gestures may be translated into media system user inputs by the device.

The handheld electronic device may remotely control a media system using radio-frequency signals or infrared signals generated by the wireless communications circuitry. The media system user inputs derived from a user's gestures may be used to generate appropriate remote control signals to remotely control a media system.

During operation of the handheld electronic device to control a media system, the media system may transmit signals to the handheld electronic device. For example, the media system may transmit data signals to the handheld electronic device that indicate the state of the media system. The state of the media system may reflect, for example, the current volume level, playback speed, title number, chapter number, elapsed time, and time remaining in a media playback operation of the media system.

As media system remote control gestures are supplied to the handheld electronic device, the handheld electronic device may display confirmatory information on the display of the handheld electronic device. This confirmatory information may serve to inform the user that a gesture has been properly recognized. The confirmatory information may be displayed in a way that allows the user to monitor the confirmatory information using only peripheral vision or momentary glances at the display.

Further features of the invention, its nature and various advantages will be more apparent from the accompanying drawings and the following detailed description.

DETAILED DESCRIPTION

The present invention relates generally to handheld electronic devices that have been configured to function as remote control devices and, more particularly, to remote control devices that recognize gestures performed by a user on a touch screen. The handheld devices may be configured by loading remote control software applications onto a general purpose handheld device, by incorporating remote control support into the operating system or other software on a handheld electronic device, or by using a combination of software and/or hardware to implement remote control features. Handheld electronic devices that have been configured to support media system remote control functions are sometimes referred to herein as remote control devices.

Figure 1:
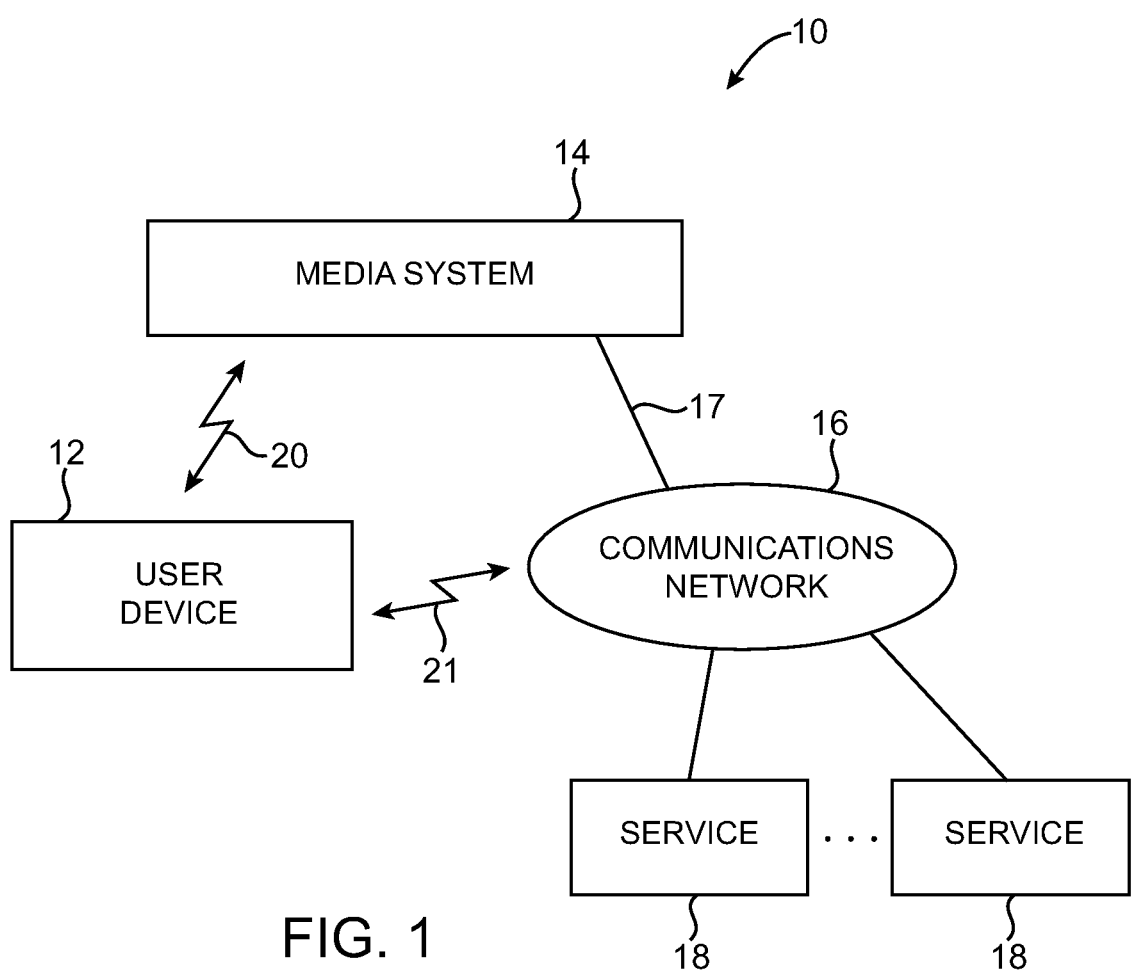
FIG. 1 is a diagram of an illustrative remote control environment in which a handheld electronic device with remote control functionality may be used in accordance with an embodiment of the present invention.

An illustrative environment in which a remote control device may operate in accordance with the present invention is shown in FIG. 1. Users in environment 10 may have user device 12. User device 12 may be used to control media system 14 over communications path 20. User device 12, media system 14, and services 18 may be connected through a communications network 16. User device 12 may connect to communications network 16 through communications path 21. In one embodiment of the invention, user device 12 may be used to control media system 14 through the communications network 16. User device 12 may also be used to control media system 14 directly.

User device 12 may have any suitable form factor. For example, user device 12 may be provided in the form of a handheld device, desktop device, or even integrated as part of a larger structure such as a table or wall. With one particularly suitable arrangement, which is sometimes described herein as an example, user device 12 may be provided with a handheld form factor. For example, device 12 may be a handheld electronic device. Illustrative handheld electronic devices that may be provided with remote control capabilities include cellular telephones, media players with wireless communications capabilities, handheld computers (also sometimes called personal digital assistants), dedicated remote control devices, global positioning system (GPS) devices, handheld gaming devices, and other handheld devices. If desired, user device 12 may be a hybrid device that combines the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, supports web browsing, and includes media player functionality. These are merely illustrative examples.

Media system 14 may be any suitable media system including but not limited to a system including one or more televisions, cable boxes (e.g., a cable set-top box receiver), handheld electronic devices with wireless communications capabilities, media players with wireless communications capabilities, satellite receivers, set-top boxes, personal computers, amplifiers, audio-video receivers, digital video recorders, personal video recorders, video cassette recorders, digital video disc (DVD) players and recorders, and other electronic devices. If desired, system 14 may include non-media devices that are controllable by a remote control device such as user device 12. For example, system 14 may include remotely controlled equipment such as home automation controls, remotely controlled light fixtures, door openers, gate openers, car alarms, automatic window shades, and fireplaces.

Communications path 17 (and the other paths in system 10) such as path 20 between device 12 and system 14, path 21 between device 12 and network 16, and the paths between network 16 and services 18 may be used to handle video, audio, and data signals. Communications paths in system 10 such as path 17 and the other paths in FIG. 1 may be based on any suitable wired or wireless communications technology. For example, the communications path in system 10 may be based on wired communications technology such as coaxial cable, copper wiring, fiber optic cable, universal serial bus (USB®), IEEE 1394 (FireWire®), paths using serial protocols, paths using parallel protocols, and Ethernet paths. Communications paths in system 10 may, if desired, be based on wireless communications technology such as satellite technology, television broadcast technology, radio-frequency (RF) technology, wireless universal serial bus technology, Wi-Fi® or Bluetooth® technology 802.11 wireless link technology. Wireless communications paths in system 10 may also include cellular telephone bands such as those at 850 MHz, 900 MHz, 1800 MHz, and 1900 MHz (e.g., the main Global System for Mobile Communications or GSM cellular telephone bands), one or more proprietary radio-frequency links, and other local and remote wireless links. Communications paths in system 10 may be based on wireless signals sent using light (e.g., using infrared communications). Communications paths in system 10 may be based on wireless signals sent using sound (e.g., using acoustic communications).

Communications path 20 may be used for one-way or two-way transmissions between user device 12 and media system 14. For example, user device 12 may transmit remote control signals to media system 14 to control the operation of media system 14. If desired, media system 14 may transmit data signals to user device 12. System 14 may, for example, transmit information to device 12 that informs device 12 of the current state of system 14. As an example, media system 14 may transmit information about a particular equipment or software state such as the current volume setting of a television or media player application or the current playback speed of a media item being presented using a media playback application or a hardware-based player.

Communications network 16 may be based on any suitable communications network or networks such as a radio-frequency network, the Internet, an Ethernet network, a wireless network, a Wi-Fi® network, a Bluetooth® network, a cellular telephone network, or a combination of such networks.

Services 18 may include television and media services. For example, services 18 may include cable television providers, television broadcast services (e.g., television broadcasting towers), satellite television providers, email services, media servers (e.g., servers that supply video, music, photos, etc.), media sharing services, media stores, programming guide services, software update providers, game networks, etc. Services 18 may communicate with media system 14 and user device 12 through communications network 16.

In a typical scenario, media system 14 is used by a user to view media. For example, media system 14 may be used to play compact disks, video disks, tapes, and hard-drive-based media files. The songs, videos, and other content may be presented to the user using speakers and display screens. In a typical scenario, visual content such as a television program that is received from a cable provider may be displayed on a television. Audio content such as a song may be streamed from an on-line source or may be played back from a local hard-drive. These are merely illustrative examples. Users may interact with a variety of different media types in any suitable formats using software-based and/or hardware-based media playback equipment.

The equipment in media system 14 may be controlled by conventional remote controls (e.g., dedicated infrared remote controls that are shipped with the equipment). The equipment in media system 14 may also be controlled using user device 12. User device 12 may have a touch screen that allows device 12 to recognize gestures. Media system remote control functionality may be implemented on device 12 (e.g., using software and/or hardware in device 12). The remote control functionality may, if desired, be provided in addition to other functions. For example, the media system remote control functionality may be implemented on a device that normally functions as a music player, cellular telephone, or hybrid music player and cellular telephone device (as examples). With this type of arrangement, a user may use device 12 for a variety of media and communications functions when the user carries device 12 away from system 14. When the user brings device 12 into proximity of system 14 or when a user desires to control system 14 remotely (e.g., through a cellular telephone link or other remote network link), the remote control capabilities of device 12 may be used to control system 14. In a typical configuration, a user views video content or listens to audio content (herein collectively "views content") while seated in a room that contains at least some of the components of system 14 (e.g., a display and speakers).

The ability of user device 12 to recognize gesture-based remote control commands allows device 12 to provide remote control functionality without requiring dedicated remote control buttons. Dedicated buttons on device 12 may be used to help control system 14 if desired, but in general such buttons are not needed. The remote control interface aspect of device 12 therefore need not interfere with the normal operation of device 12 for non-remote-control functions (e.g., accessing email messages, surfing the web, placing cellular telephone calls, playing music, etc.). Another advantage to using a gesture-based remote control interface for device 12 is that gesture-based remote control interfaces are relatively uncluttered.

Figure 2:
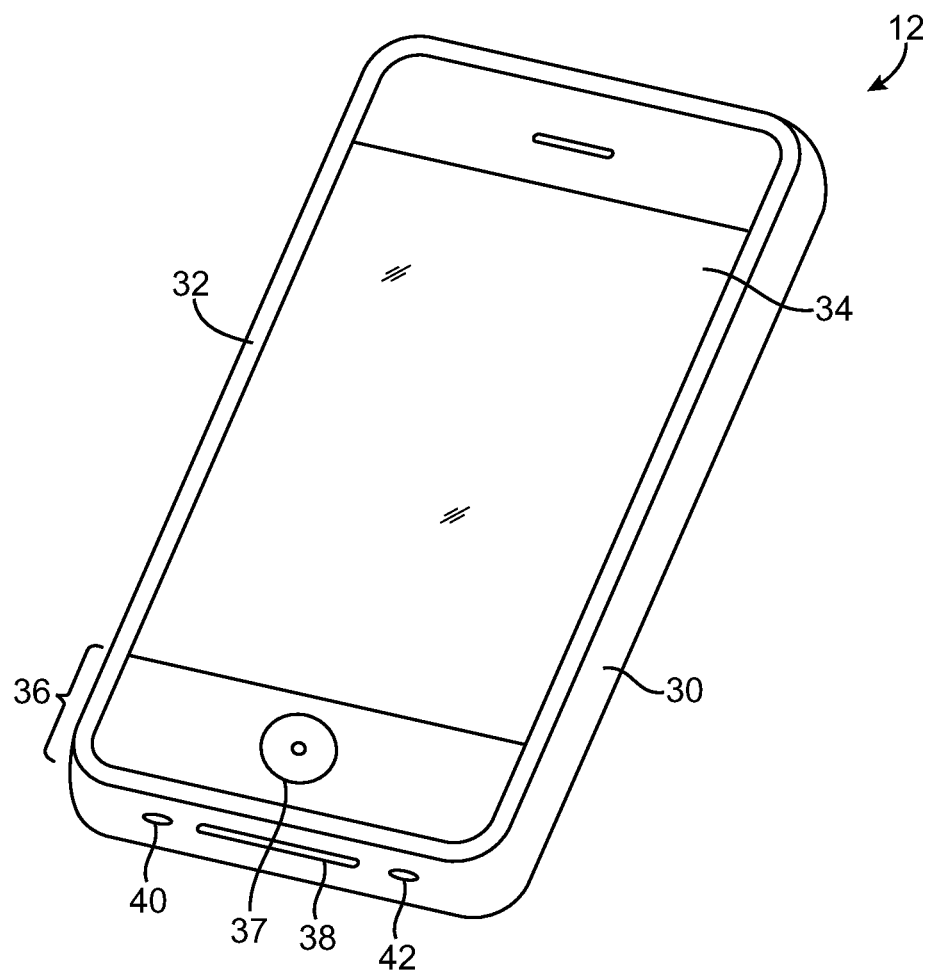
FIG. 2 is a perspective view of an illustrative remote control implemented in a handheld electronic device in accordance with an embodiment of the present invention.

An illustrative user device 12 in accordance with an embodiment of the present invention is shown in FIG. 2. User device 12 may be any suitable portable or handheld electronic device.

User device 12 may include one or more antennas for handling wireless communications. If desired, an antenna in device 12 may be shared between multiple radio-frequency transceivers (radios). There may also be one or more dedicated antennas in device 12 (e.g., antennas that are each associated with a respective radio).

User device 12 may handle communications over one or more communications bands. For example, in a user device 12 with two antennas, a first of the two antennas may be used to handle cellular telephone and data communications in one or more frequency bands, whereas a second of the two antennas may be used to handle data communications in a separate communications band. With one suitable arrangement, which is sometimes described herein as an example, the second antenna may be shared between two or more transceivers. With this type of arrangement, the second antenna may be configured to handle data communications in a communications band centered at 2.4 GHz. A first transceiver may be used to communicate using the Wi-Fi® (IEEE 802.11) band at 2.4 GHz and a second transceiver may be used to communicate using the Bluetooth® band at 2.4 GHz. To minimize device size and antenna resources, the first transceiver and second transceiver may share a common antenna.

In configurations with multiple antennas, the antennas may be designed to reduce interference so as to allow the two antennas to operate in relatively close proximity to each other. For example, in a configuration in which one antenna is used to handle cellular telephone bands (and optional additional bands) and in which another antenna is used to support shared Wi-Fi/Bluetooth communications, the antennas may be configured to reduce interference with each other.

Device 12 may have a housing 30. Housing 30, which is sometimes referred to as a case, may be formed of any suitable materials including, plastic, glass, ceramics, metal, or other suitable materials, or a combination of these materials. In some situations, housing 30 or portions of housing 30 may be formed from a dielectric or other low-conductivity material, so that the operation of conductive antenna elements that are located in proximity to housing 30 is not disrupted.

Housing 30 or portions of housing 30 may also be formed from conductive materials such as metal. An illustrative conductive housing material that may be used is anodized aluminum. Aluminum is relatively light in weight and, when anodized, has an attractive insulating and scratch-resistant surface. If desired, other metals can be used for the housing of user device 12, such as stainless steel, magnesium, titanium, alloys of these metals and other metals, etc. In scenarios in which housing 30 is formed from metal elements, one or more of the metal elements may be used as part of the antennas in user device 12. For example, metal portions of housing 30 may be shorted to an internal ground plane in user device 12 to create a larger ground plane element for that user device 12.

Housing 30 may have a bezel 32. The bezel 32 may be formed from a conductive material such as stainless steel. Bezel 32 may serve to hold a display or other device with a planar surface in place on user device 12. As shown in FIG. 2, for example, bezel 32 may be used to hold display 34 in place by attaching display 34 to housing 30. User device 12 may have front and rear planar surfaces. In the example of FIG. 2, display 34 is shown as being formed as part of the planar front surface of user device 12.

Display 34 may be a liquid crystal diode (LCD) display, an organic light emitting diode (OLED) display, or any other suitable display. The outermost surface of display 34 may be formed from one or more plastic or glass layers. If desired, touch screen functionality may be integrated into display 34 or may be provided using a separate touch pad device. An advantage of integrating a touch screen into display 34 to make display 34 touch sensitive is that this type of arrangement can save space and reduce visual clutter. Arrangements in which display 34 has touch screen functionality may also be particularly advantageous when it is desired to control media system 14 using gesture-based commands.

Display 34 may have a touch screen layer and a display layer. The display layer may have numerous pixels (e.g., thousands, tens of thousands, hundreds of thousands, millions, or more) that may be used to display a graphical user interface (GUI). The touch layer may be a clear panel with a touch sensitive surface positioned in front of a display screen so that the touch sensitive surface covers the viewable area of the display screen. The touch panel may sense touch events (e.g., user input) at the x and y coordinates on the touch screen layer where a user input is made (e.g., at the coordinates where the user touches display 34). The touch screen layer may be used in implementing multi-touch capabilities for user device 12 in which multiple touch events can be simultaneously received by display 34. Multi-touch capabilities may allow for more complex user inputs on touch screen display 34. The touch screen layer may be based on touch screen technologies such as resistive, capacitive, infrared, surface acoustic wave, electromagnetic, near field imaging, etc.

Display screen 34 (e.g., a touch screen) is merely one example of an input-output device that may be used with user device 12. If desired, user device 12 may have other input-output devices. For example, user device 12 may have user input control devices such as button 37, and input-output components such as port 38 and one or more input-output jacks (e.g., for audio and/or video). Button 37 may be, for example, a menu button. Port 38 may contain a 30-pin data connector (as an example). Openings 42 and 40 may, if desired, form microphone and speaker ports. Suitable user input interface devices for user device 12 may also include buttons such as alphanumeric keys, power on-off, power-on, power-off, and other specialized buttons, a touch pad, pointing stick, or other cursor control device, a microphone for supplying voice commands, or any other suitable interface for controlling user device 12. In the example of FIG. 2, display screen 34 is shown as being mounted on the front face of user device 12, but display screen 34 may, if desired, be mounted on the rear face of user device 12, on a side of user device 12, on a flip-up portion of user device 12 that is attached to a main body portion of user device 12 by a hinge (for example), or using any other suitable mounting arrangement.

Although shown schematically as being formed on the top face of user device 12 in the example of FIG. 2, buttons such as button 37 and other user input interface devices may generally be formed on any suitable portion of user device 12. For example, a button such as button 37 or other user interface control may be formed on the side of user device 12. Buttons and other user interface controls can also be located on the top face, rear face, or other portion of user device 12. If desired, user device 12 can be controlled remotely (e.g., using an infrared remote control, a radio-frequency remote control such as a Bluetooth remote control, etc.)

User device 12 may have ports such as port 38. Port 38, which may sometimes be referred to as a dock connector, 30-pin data port connector, input-output port, or bus connector, may be used as an input-output port (e.g., when connecting user device 12 to a mating dock connected to a computer or other electronic device). User device 12 may also have audio and video jacks that allow user device 12 to interface with external components. Typical ports include power jacks to recharge a battery within user device 12 or to operate user device 12 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of user device 12 can be controlled using input interface devices such as touch screen display 34.

Components such as display 34 and other user input interface devices may cover most of the available surface area on the front face of user device 12 (as shown in the example of FIG. 2) or may occupy only a small portion of the front face of user device 12.

With one suitable arrangement, one or more antennas for user device 12 may be located in the lower end 36 of user device 12, in the proximity of port 38. An advantage of locating antennas in the lower portion of housing 30 and user device 12 is that this places the antennas away from the user's head when the user device 12 is held to the head (e.g., when talking into a microphone and listening to a speaker in the user device as with a cellular telephone). This may reduce the amount of radio-frequency radiation that is emitted in the vicinity of the user and may minimize proximity effects.

Figure 3:
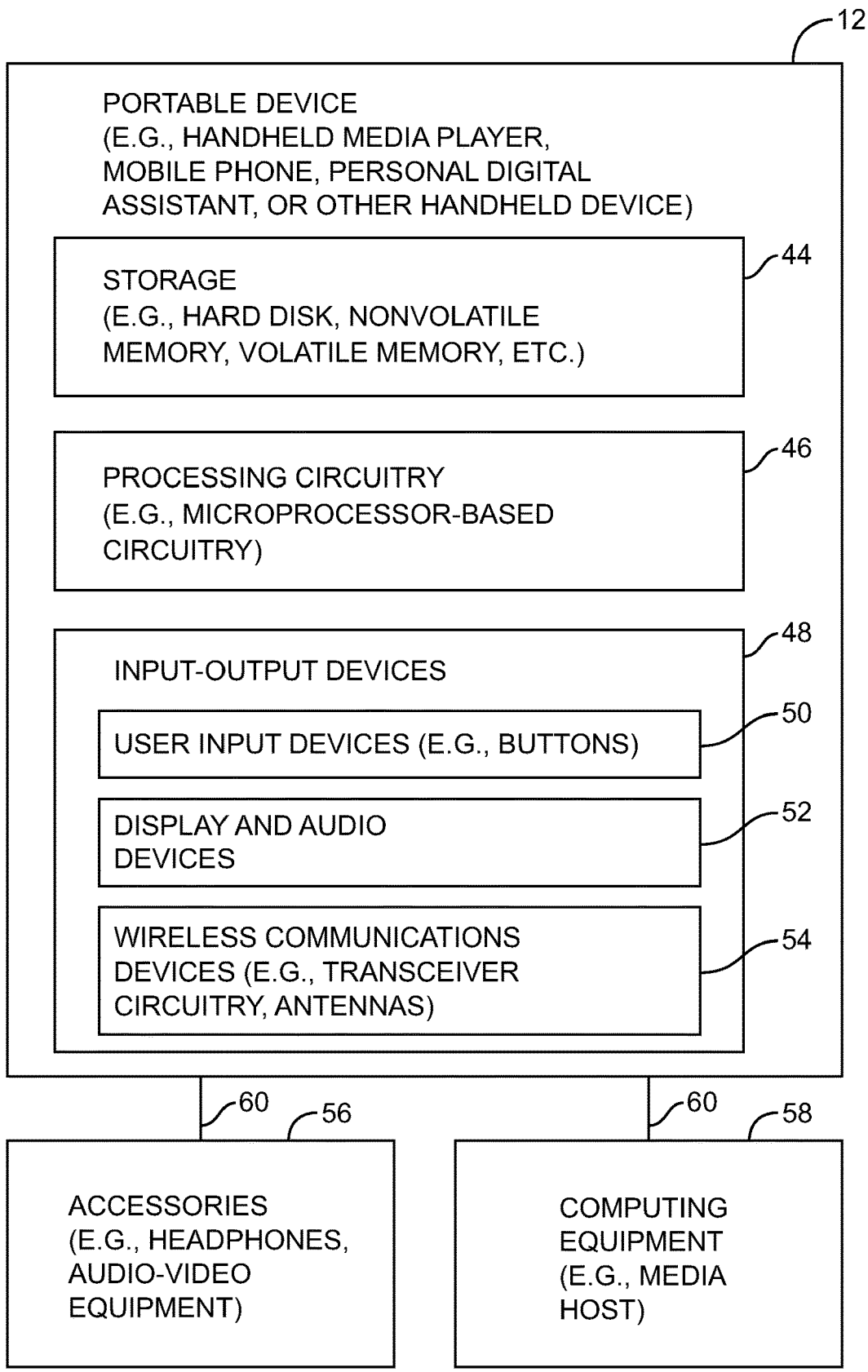
FIG. 3 is a schematic diagram of an illustrative remote control implemented in a handheld electronic device in accordance with an embodiment of the present invention.

A schematic diagram of an embodiment of an illustrative user device 12 is shown in FIG. 3. User device 12 may be a mobile telephone, a mobile telephone with media player capabilities, a handheld computer, a remote control, a game player, a global positioning system (GPS) device, a combination of such devices, or any other suitable portable electronic device.

As shown in FIG. 3, user device 12 may include storage 44. Storage 44 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 46 may be used to control the operation of user device 12. Processing circuitry 46 may be based on a processor such as a microprocessor and other suitable integrated circuits. With one suitable arrangement, processing circuitry 46 and storage 44 are used to run software on user device 12, such as remote control applications, internet browsing applications, voice-over-internet-protocol (VOIP) telephone call applications, email applications, media playback applications, operating system functions (e.g., operating system functions supporting remote control capabilities), etc. Processing circuitry 46 and storage 44 may be used in implementing communications protocols for device 12. Communications protocols that may be implemented using processing circuitry 46 and storage 44 include internet protocols, wireless local area network protocols (e.g., IEEE 802.11 protocols, protocols for other short-range wireless communications links such as the Bluetooth® protocol, infrared communications, etc.), and cellular telephone protocols.

Input-output devices 48 may be used to allow data to be supplied to user device 12 and to allow data to be provided from user device 12 to external devices. Display screen 34, button 37, microphone port 42, speaker port 40, and dock connector port 38 are examples of input-output devices 48.

Input-output devices 48 can include user input devices 50 such as buttons, touch screens, joysticks, click wheels, scrolling wheels, touch pads, key pads, keyboards, microphones, cameras, etc. A user can control the operation of user device 12 by supplying commands through user input devices 50. Display and audio devices 52 may include liquid-crystal display (LCD) screens or other screens, light-emitting diodes (LEDs), and other components that present visual information and status data. Display and audio devices 52 may also include audio equipment such as speakers and other devices for creating sound. Display and audio devices 52 may contain audio-video interface equipment such as jacks and other connectors for external headphones and monitors.

Wireless communications devices 54 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications circuitry in circuitry 54).

User device 12 can communicate with external devices such as accessories 56 and computing equipment 58, as shown by paths 60. Paths 60 may include wired and wireless paths (e.g., bidirectional wireless paths). Accessories 56 may include headphones (e.g., a wireless cellular headset or audio headphones) and audio-video equipment (e.g., wireless speakers, a game controller, or other equipment that receives and plays audio and video content).

Computing equipment 58 may be any suitable computer. With one suitable arrangement, computing equipment 58 is a computer that has an associated wireless access point (router) or an internal or external wireless card that establishes a wireless connection with user device 12. The computer may be a server (e.g., an internet server), a local area network computer with or without internet access, a user's own personal computer, a peer device (e.g., another user device 12), or any other suitable computing equipment. Computing equipment 58 may be associated with one or more services such as services 18 of FIG. 1. A link such as link 60 may be used to connect device 12 to a media system such as media system 14 (FIG. 1).

Wireless communications devices 54 may be used to support local and remote wireless links.

Examples of local wireless links include infrared communications, Wi-Fi®, Bluetooth®, and wireless universal serial bus (USB) links. Because wireless Wi-Fi links are typically used to establish data links with local area networks, links such as Wi-Fi® links are sometimes referred to as WLAN links. The local wireless links may operate in any suitable frequency band. For example, WLAN links may operate at 2.4 GHz or 5.6 GHz (as examples), whereas Bluetooth links may operate at 2.4 GHz. The frequencies that are used to support these local links in user device 12 may depend on the country in which user device 12 is being deployed (e.g., to comply with local regulations), the available hardware of the WLAN or other equipment with which user device 12 is connecting, and other factors. An advantage of incorporating WLAN capabilities into wireless communications devices 54 is that WLAN capabilities (e.g., Wi-Fi capabilities) are widely deployed. The wide acceptance of such capabilities may make it possible to control a relatively wide range of media equipment in media system 14.

If desired, wireless communications devices 54 may include circuitry for communicating over remote communications links. Typical remote link communications frequency bands include the cellular telephone bands at 850 MHz, 900 MHz, 1800 MHz, and 1900 MHz, the global positioning system (GPS) band at 1575 MHz, and data service bands such as the 3G data communications band at 2170 MHz band (commonly referred to as UMTS or Universal Mobile Telecommunications System). In these illustrative remote communications links, data is transmitted over links 60 that are one or more miles long, whereas in short-range links 60, a wireless signal is typically used to convey data over tens or hundreds of feet.

These are merely illustrative communications bands over which wireless devices 54 may operate. Additional local and remote communications bands are expected to be deployed in the future as new wireless services are made available. Wireless devices 54 may be configured to operate over any suitable band or bands to cover any existing or new services of interest. If desired, multiple antennas and/or a broadband antenna may be provided in wireless devices 54 to allow coverage of more bands.

Figure 4:
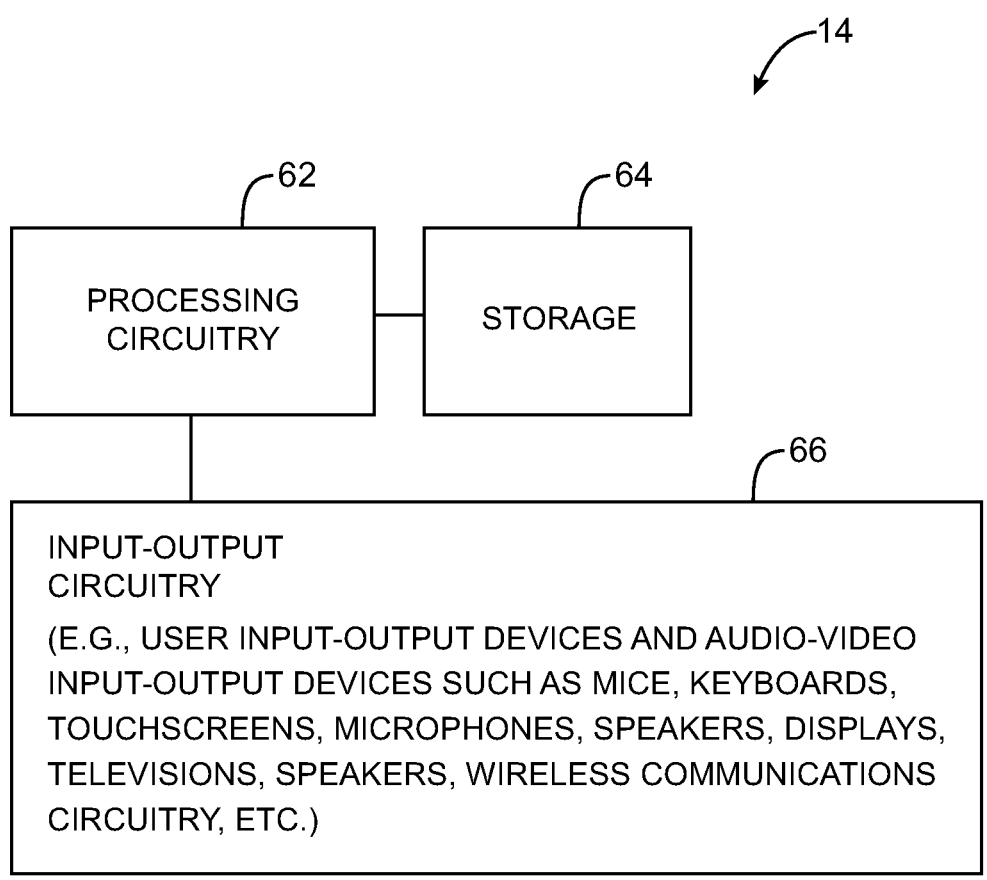
FIG. 4 is a generalized schematic diagram of an illustrative media system that may be controlled by a handheld electronic device with remote control functionality in accordance with an embodiment of the present invention.

A schematic diagram of an embodiment of an illustrative media system is shown in FIG. 4. Media system 14 may include any suitable media equipment such as televisions, cable boxes (e.g., a cable receiver), handheld electronic devices with wireless communications capabilities, media players with wireless communications capabilities, satellite receivers, set-top boxes, personal computers, amplifiers, audio-video receivers, digital video recorders, personal video recorders, video cassette recorders, digital video disc (DVD) players and recorders, other electronic devices. System 14 may also include home automation controls, remote controlled light fixtures, door openers, gate openers, car alarms, automatic window shades, and fireplaces.

As shown in FIG. 4, media system 14 may include storage 64. Storage 64 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 62 may be used to control the operation of media system 14. Processing circuitry 62 may be based on one or more processors such as microprocessors, microcontrollers, digital signal processors, application specific integrated circuits, and other suitable integrated circuits. With one suitable arrangement, processing circuitry 62 and storage 64 are used to run software on media system 14, such as a remote control applications, media playback applications, television tuner applications, radio tuner applications (e.g., for FM and AM tuners), file server applications, operating system functions, and presentation programs (e.g., a slide show).

Input-output circuitry 66 may be used to allow user input and data to be supplied to media system 14 and to allow user input and data to be provided from media system 14 to external devices. Input-output circuitry 66 can include user input-output devices and audio-video input-output devices such as mice, keyboards, touch screens, microphones, speakers, displays, televisions, speakers, and wireless communications circuitry.

Suitable communications protocols that may be implemented as part of input-output circuitry 66 include internet protocols, wireless local area network protocols (e.g., IEEE 802.11 protocols), protocols for other short-range wireless communications links such as the Bluetooth® protocol, protocols for handling 3G data services such as UMTS, cellular telephone communications protocols, etc.

Figure 5:
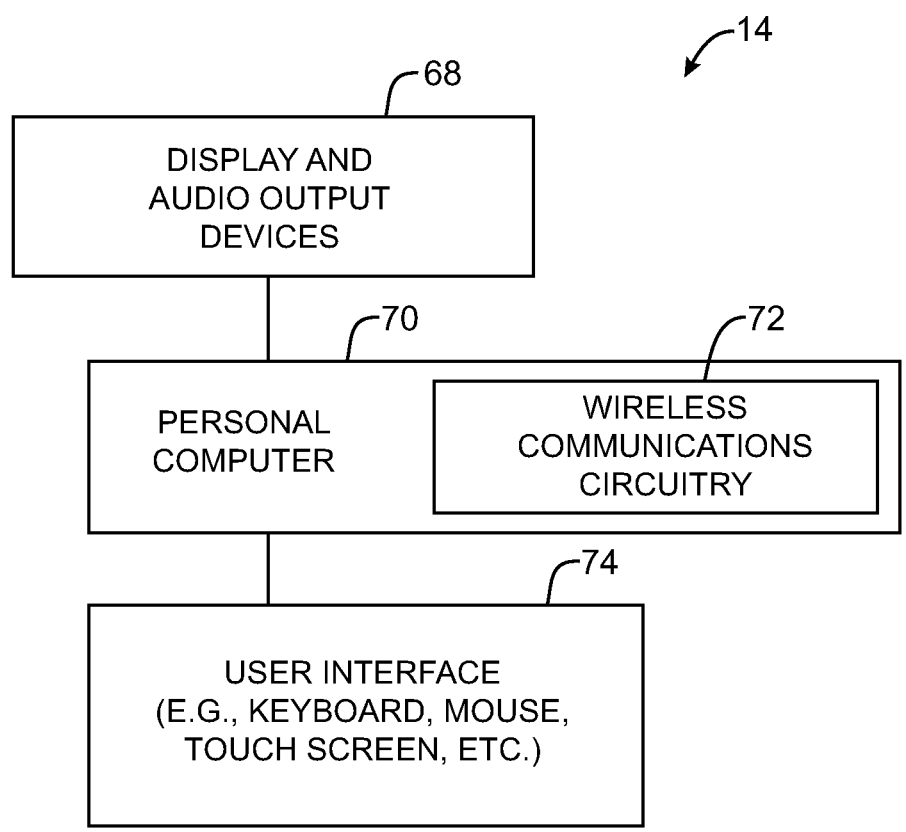
FIG. 5 is a schematic diagram of an illustrative media system based on a personal computer that may be controlled by a handheld electronic device with remote control functionality in accordance with an embodiment of the present invention.

A schematic diagram of an embodiment of an illustrative media system that includes a computer is shown in FIG. 5. In the embodiment shown in FIG. 5, media system 14 may be based on a personal computer such as personal computer 70. Personal computer 70 may be any suitable personal computer 70 such as a personal desktop computer, a laptop computer, a computer that is used to implement media control functions (e.g., as part of a set-top box), a server, etc.

As shown in FIG. 5, personal computer 70 may include display and audio output devices 68. Display and audio output devices 68 may include one or more different types of display and audio output devices such as computer monitors, televisions, projectors, speakers, headphones, and audio amplifiers.

Personal computer 70 may include user interface 74. User interface 74 may include devices such as keyboards, mice, touch screens, trackballs, etc.

Personal computer 70 may include wireless communications circuitry 72. Wireless communications circuitry 72 may be used to allow user input and data to be supplied to personal computer 70 and to allow user input and data to be provided from personal computer 70 to external devices. Wireless communications circuitry 72 may implement suitable communications protocols. Suitable communications protocols that may be implemented as part of wireless communications circuitry 72 include internet protocols, wireless local area network protocols (e.g., IEEE 802.11 protocols—sometimes referred to as) Wi-Fi®, protocols for other short-range wireless communications links such as the Bluetooth® protocol, protocols for handling 3G data services such as UMTS, cellular telephone communications protocols, etc. Wireless communications circuitry 72 may be provided using a transceiver that is mounted on the same circuit board as other components in computer 70, may be provided using a plug-in card (e.g., a PCI card), or may be provided using external equipments (e.g., a wireless universal serial bus adapter). Wireless communications circuitry 72 may, if desired, include infrared communications capabilities (e.g., to receive IR commands from device 12).

Figure 6:
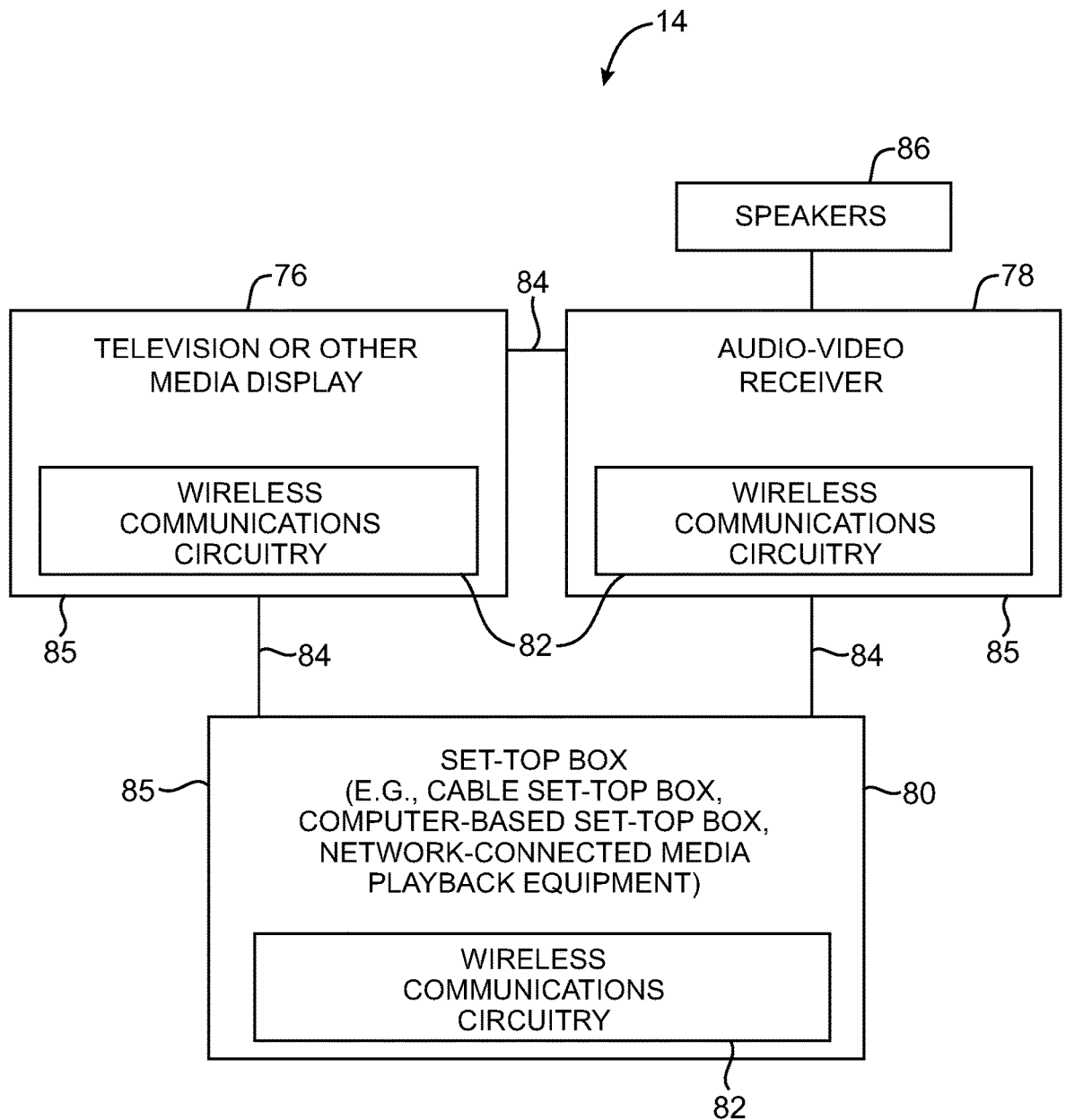
FIG. 6 is a schematic diagraph of an illustrative media system based on consumer electronic equipment such as a television, set-top box, and audio-video receiver that may be controlled by a handheld electronic device with remote control functionality in accordance with an embodiment of the present invention.

FIG. 6 is a schematic diagram of an illustrative media system that is based on consumer electronics devices in accordance with an embodiment of the present invention. In the embodiment of FIG. 6, media system 14 may include one or more media system components (sometimes called systems) such as media system 76, media system 78, and media system 80.

As shown in FIG. 6, media system 76 may be a television or other media display, media system 78 may be an audio-video receiver connected to speakers 86, and media system 80 may be a set-top box (e.g., a cable set-top box, a computer-based set-top box, network-connected media playback equipment of the type that can play wirelessly streamed media files through an audio-video receiver such as receiver 78, etc.).

Media system 76 may be a television or other media display. For example, media system 76 may be display such as a high-definition television, plasma screen, liquid crystal display (LCD), organic light emitting diode (OLED) display, etc. Television 76 may include a television tuner. A user may watch a desired television program by using the tuner to tune to an appropriate television channel. Television 76 may have integrated speakers. Using remote control commands, a user of television 76 may perform functions such as changing the current television channel for the tuner or adjusting the volume produced by the speakers in television 76.

Media system 78 may be an audio-video receiver. For example, media system 78 may be a receiver that has the ability to switch between various video and audio inputs. Media system 78 may be used to amplify audio signals for playback over speakers 86. Audio that is to be amplified by system 78 may be provided in digital or analog form from television 76 and media system 80.

Media system 80 may be a set-top box. For example, media system 80 may be a cable receiver, computer-based set-top box, network-connected media playback equipment, personal video recorder, digital video recorder, etc.

Media systems 76, 78, and 80 may be interconnected via paths 84. Paths 84 may be based on any suitable wired or wireless communication technology. In one embodiment, audio-video receiver 78 may receive audio signals from television 76 and set-top box 80 via paths 84. These audio signals may be provided as digital signals or analog signals. Receiver 78 may amplify the received audio signals and may provide corresponding amplified output to speakers 86. Set-top box 80 may supply video and audio signals to the television 76 and may supply video and audio signals to audio-video receiver 78. Set-top box 80 may, for example, receive television signals from a television provider on a television signal input line. A tuner in set-top box 80 may be used to tune to a desired television channel. A video and audio signal corresponding to this channel may be supplied to television 76 and receiver 78. Set-top box 80 may also supply recorded content (e.g., content that has been recorded on a hard-drive), downloaded content (e.g., video and audio files that have been downloaded from the Internet, etc.)

If desired, television 76 may send video and audio signals to a digital video recorder (set-top box 80) while simultaneously sending audio to audio-video receiver 78 for playback over speakers 86. These examples are merely illustrative as the media system components of FIG. 6 may be interconnected in any suitable manner.

Media system components 76, 78, and 80 may include wireless communications circuitry 82. Wireless communications circuitry 82 may be used to allow user input and other information to be exchanged between media systems 76, 78, and 80, user device 12, and services 18. Wireless communications circuitry 82 may be used to implement one or more communications protocols. Suitable communications protocols that may be implemented as part of wireless communications circuitry 82 include internet protocols, wireless local area network protocols (e.g., IEEE 802.11 protocols), protocols for other short-range wireless communications links such as the Bluetooth® protocol, protocols for handling 3G data services such as UMTS, cellular telephone communications protocols, etc.

Media system components 76, 78, and 80 may also exchange user input and data through paths such as paths 84. Paths 84 may be wireless or wired paths. If one or more of media systems 76, 78, and 80 is inaccessible to user device 12 by communications path 20 (FIG. 1), then any media system 76, 78, or 80 that has access to user device 12 through communications path 20 may form a bridge, using one of paths 84, between user device 12 and any media systems that do not have direct access to user device 12 via communications path 20.

Figure 7:
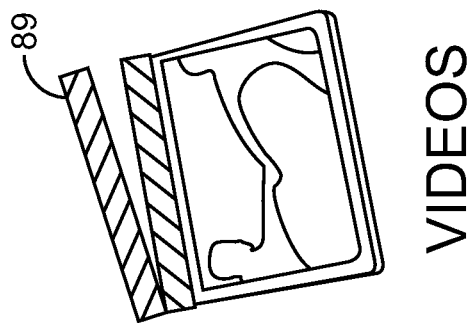
FIG. 7 is an illustrative main menu display screen that may be displayed by a media system that is controlled by a handheld electronic device that includes remote control capabilities in accordance with an embodiment of the present invention.
Figure 7:
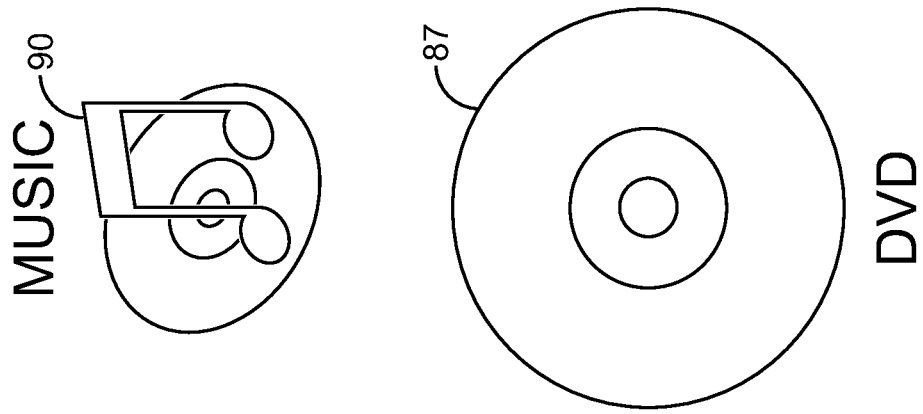
Figure 7:
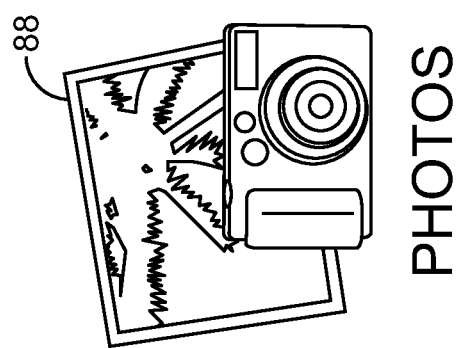

FIG. 7 shows an illustrative menu display screen that may be provided by media system 14. Media system 14 may present the menu screen of FIG. 7 when the user has a selection of various media types available. In the example of FIG. 7, the selectable media types include DVD 87, photos 88, videos 89, and music 90. This is merely illustrative. Any suitable menu options may be presented with media system 14 to allow a user to choose between different available media types, to select between different modes of operation, to enter a setup mode, etc.

User device 12 may be used to browse through the selectable media options that are presented by media system 14. User device 12 may also be used to select a media option. For example, user device 12 may wirelessly send commands to media system 14 through path 20 that direct media system 14 to move through selectable media options. When moving through selectable media options, each possible selection may rotate to bring a new media option to the forefront (i.e., a prominent central location of the display). In this type of configuration, user device 12 may send user input to media system 14 through path 20 to select the media option that is currently in the highlighted (i.e., the option that is displayed at the bottom in the FIG. 7 example). If desired, user device 12 may send commands to media system 14 through path 20 to select any of the displayed selectable media options without first scrolling through a set of available options to visually highlight a particular option.

Figure 8:
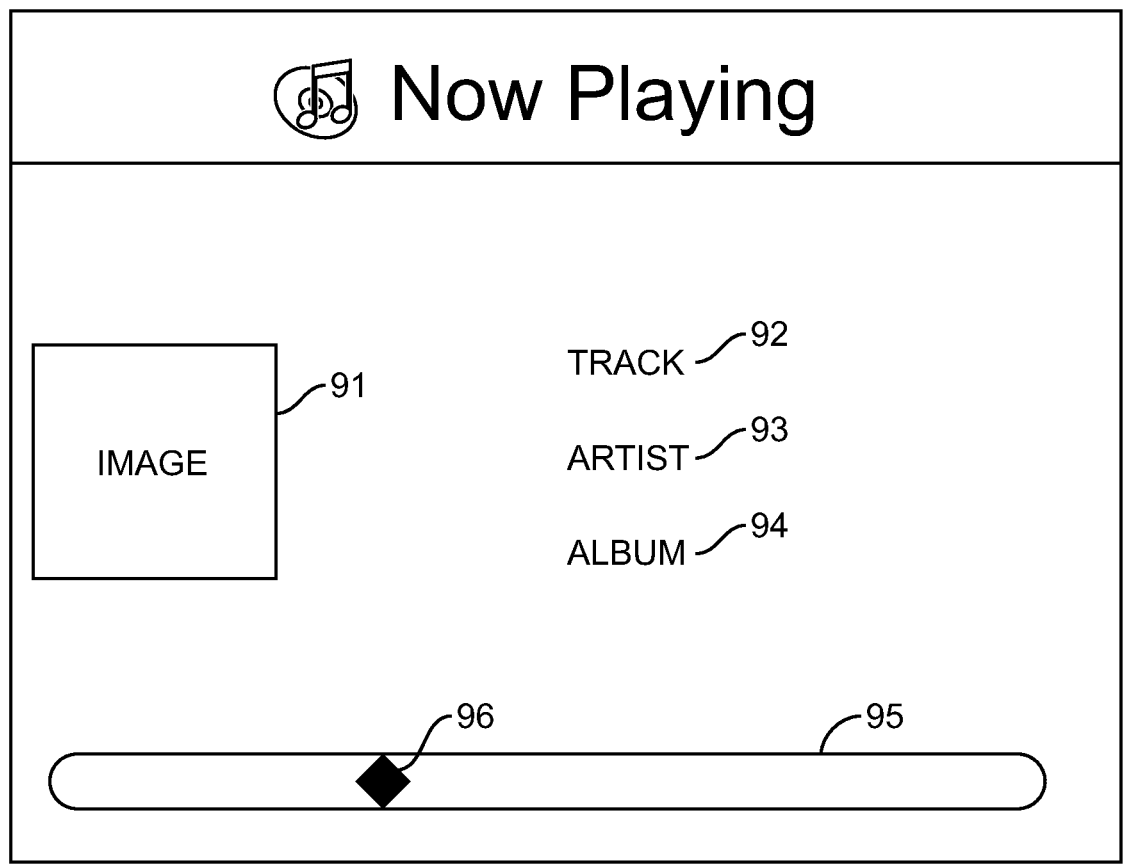
FIG. 8 is an illustrative now playing display screen that may be displayed by a media system that is controlled by a handheld electronic device with remote control capabilities in accordance with an embodiment of the present invention.

FIG. 8 shows an illustrative now playing display screen that may be presented to a user by media system 14. Media system 14 may present the now playing screen of FIG. 8 when media system 14 is performing a media playback operation. For example, when media system 14 is playing an audio track, media system 14 may display a screen with an image 91 (e.g., album art), progress bar 95, progress indicator 96, and track information such as the audio track name 92, artist name 93, and album name 94.

User device 12 may be used to perform remote control functions during the playback of an audio (or video) track (e.g., when media system 14 is displaying a now playing screen of the type shown in FIG. 8) and when audio (or video) information is being presented to the user (e.g., through speakers or a display in system 14). For example, user device 12 may send user input commands to media system 14 through path 20 to increase or decrease a volume setting, to initiate a play operation, pause operation, fast forward operation, rewind operation, or skip tracks operation.

Figure 9:
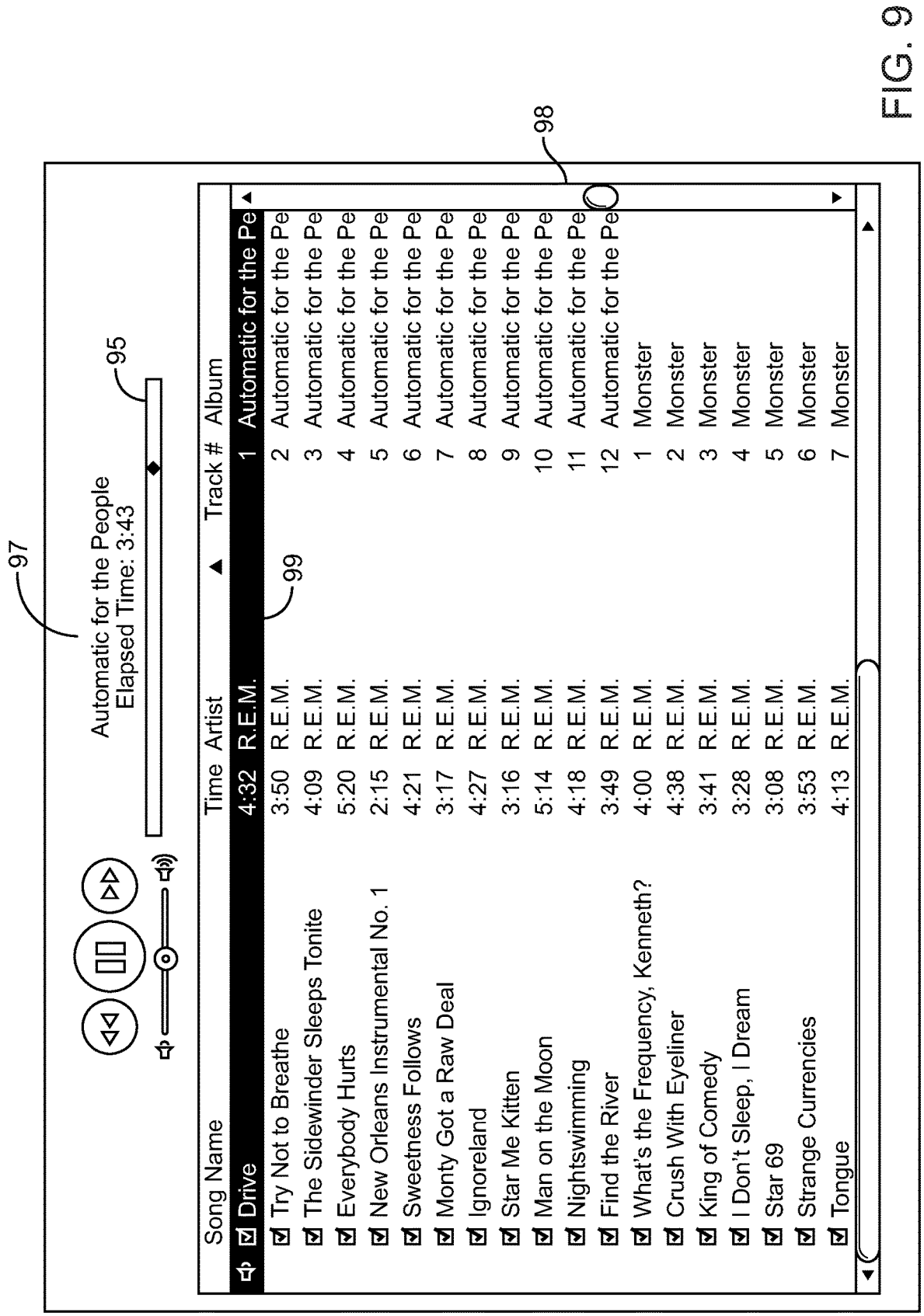
FIG. 9 is an illustrative display screen that may be displayed by a media application that includes a list of songs or other selectable media items and that may be controlled by a handheld electronic device with remote control capabilities in accordance with an embodiment of the present invention.

FIG. 9 shows an illustrative display screen associated with a media application running on media system 14. Media system 14 may use a media application to present the list of available media items in the screen of FIG. 9 when media system 14 is performing a media playback operation or when a user is interested in selecting songs, videos, or other media items for inclusion in a playlist. For example, when media system 14 is playing an audio track, media system 14 may display a screen with track information 97, progress bar 95, track listing region 98, and information on the currently highlighted track 99.

User device 12 may be used to remotely control the currently playing audio track listed in track information region 97. With this type of arrangement, user device 12 may send commands to media system 14 through path 20 to increase or decrease volume, play, pause, fast forward, rewind, or skip tracks. User device 12 may also perform remote control functions on the track listings 98. For example, user device 12 may send user input to media system 14 through path 20 that directs media system 14 to scroll a highlight region through the track listings 98 and to select a highlighted track that is to be played by media system 14.

Screens such as the menu screen of FIG. 7, the now playing screen of FIG. 8, and the media item selection list screen of FIG. 9 are merely examples of the types of information that may be displayed by the media system during operation. For example, media system 14 may present different screens or screens with more information (e.g., information on television shows, etc.) than the screens of FIGS. 7, 8, and 9. The screens of FIGS. 7, 8, and 9 are merely illustrative.

The gesture capabilities of user device 12 may be used when implementing the remote control operation in user device 12. For example, device 12 may contain hardware and/or software that recognizes when the user makes an upward gesture on the touch screen of device 12. When this gesture is made, device 12 may direct media system to take an appropriate action. For example, user device 12 may direct media system 14 to increase a volume level associated with one or more hardware and/or software components in media system 14. The volume level that is adjusted in this way may be a television volume, an audio-video receiver volume, a set-top box volume, a personal computer volume, a volume level associated with a now playing screen of the type shown in FIG. 8, a volume level associated with a currently playing media item shown on a media item selection screen of the type shown in FIG. 9, etc.

Figure 10:
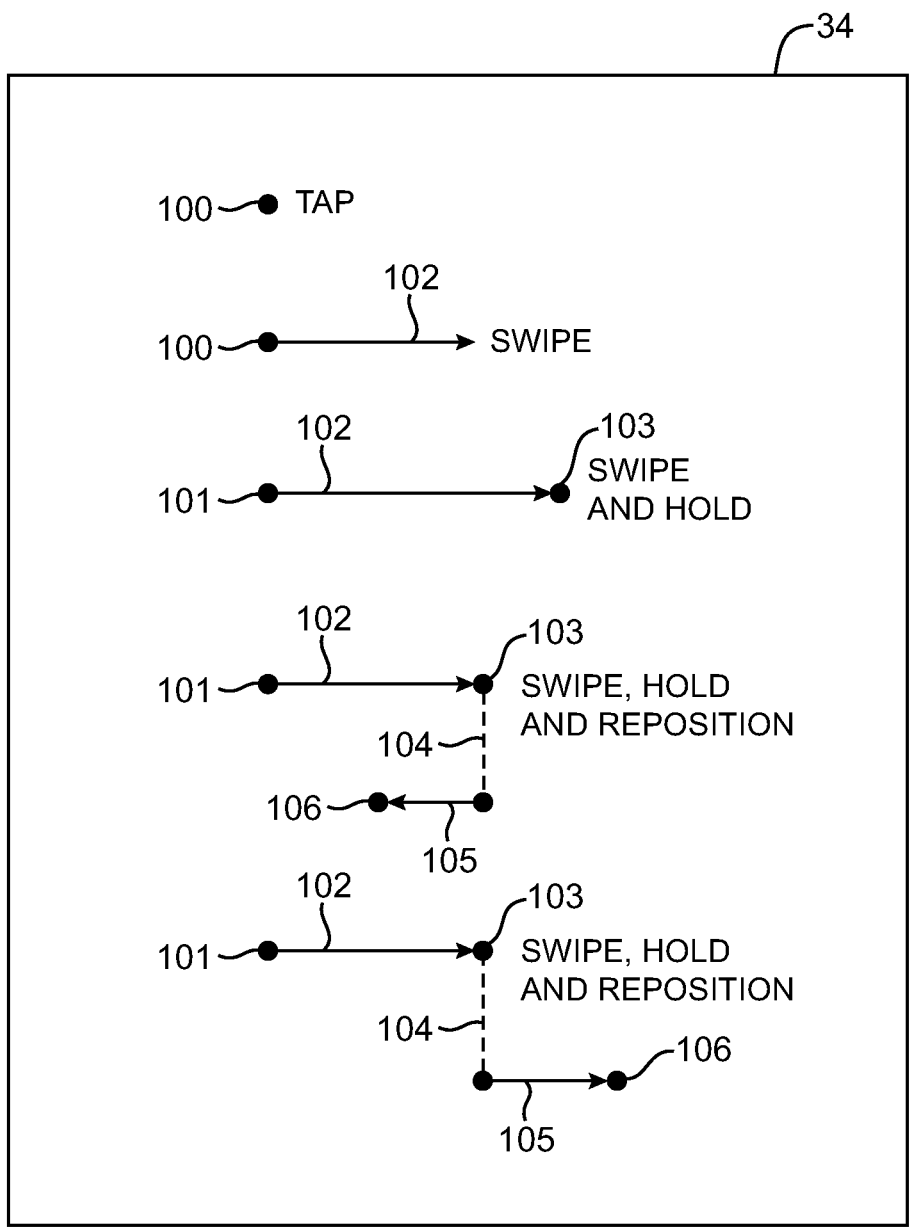
FIG. 10 shows illustrative media system remote control gestures that may be supplied by a user of a handheld electronic device with gesture recognition capabilities in accordance with an embodiment of the present invention.

FIG. 10 is a diagram of illustrative input gestures that may be used to control media system 14 with user device 12. The input gestures of FIG. 10 may be supplied to user device 12 by a user. In response, user device 12 may generate commands for media system 14 that remotely control media system 14 over path 20 (e.g., a wireless path such as an IR or RF path). User device 12 may generate media system user input commands from input gestures that are made by a user on the touch screen of device 12. Device 12 may then transmit these commands to media system 14 through path 20 or through path 21, communications network 17, and path 17.

Input gestures may be supplied to device 12 using any suitable input-output device. For example, a touch screen, mouse, trackball, or pointing device may allow input gestures to be supplied to device 12. In a typical scenario, a user uses touch screen 34 (FIG. 2) to supply device 12 with a desired gestural input. In response to the input gesture(s) from the user, user device 12 may perform a remote control function and may send a suitable corresponding remote control signal over wireless path 20 to media system 14 or may send a suitable remote control signal to media system 14 over wireless path 21 through communications network 16. In one embodiment, input gestures may be made by a user interacting with a touch screen display such as touch screen display 34 of user device 12.

While use of a user's finger to interact with a touch screen display 34 is sometimes described herein as an example, any suitable technique may be used to supply gesture-based media system remote control commands to device 12. For example, an input device such as a keyboard, mouse, trackball, stylus, or pen may be used to supply gesture inputs for user device 12.

One type of gesture that a user may make with device 12 is a tap. A user may tap touch screen display 34 at a particular location such as tap point 100 in the example of FIG. 10. In this type of arrangement, the user may quickly tap the touch screen display 34 in any part of the screen (e.g., to select an item on the screen, to launch an application, to perform an action by tapping on an icon, etc.). Single taps and multiple taps (e.g., two taps in rapid succession) may be used as gestures. If desired, a user may touch a part of the touch screen display 34 and prolong the touch over time. This type of persistent tapping gesture may result in different remote control behaviors for device 12.

Another type of gesture that a user may make is a swipe. As shown in FIG. 10, a swipe gesture may be formed from a combination of a tap at tap point 101 and an associated swipe motion such as the swipe motion indicated by arrowed line 102. For example, a user may start by placing their finger at tap point 101 and then drag their finger in a swipe motion 102 across the touch screen display 34. The swipe gesture may be made relatively quickly and the finger may be removed from touch screen display 34 shortly after swipe motion 102 has been completed.

A swipe gesture may be used as a remote control command to invoke a variety of functions in media system 14. The particular function that is performed when a user makes a swipe gesture may depend on context. For example, if a user is controlling a television, a swipe gesture may control operations of the television. If the user is controlling a receiver, the swipe motion may control the receiver. If a user is controlling a set-top box or computer, the type of action that results from a user's swipe may depend on which application is currently being used and which display screen is being presented to the user by that application.

The direction in which the user makes the swipe gesture (e.g., up, down, right, left, or at an intermediate angle) may be taken into consideration. For example, a swipe in an upward direction may increase a particular media system setting, whereas a swipe in a downward direction may decrease a particular media setting.

A user may perform a swipe and hold gesture on touch screen display 34. A swipe and hold gesture may be formed from a combination of tap point 101, swipe motion 102, and hold point 103, as shown in FIG. 10. For example, a user may start by placing their finger at tap point 101. The user may then drag their finger in a swipe motion across touch screen display 34, as indicated by arrow 102. Rather than removing their finger at the end of the gesture, the user may momentarily hold their finger at hold point 103 (e.g., for a second or longer or for a fraction of a second or longer). In one embodiment, the swipe and hold gesture may continue to generate user input in user device 12 that control media system 14 until the user's finger is removed from hold point 103 of touch screen display 34. In an alternative embodiment in which the swipe and hold gesture is disabled, a swipe and hold gesture may generate the same user input as a swipe gesture.

The swipe and hold gesture may generate different user inputs on user device 12 and may subsequently perform different remote control functions on media system 14 based on the direction the swipe motion 102 is performed. As with swipes, swipe and hold gestures may be performed in various directions (e.g., up, down, left, right, or at an angle).

A swipe and hold gesture may be followed by a repositioning of the user's finger on touch screen display 34. This type of input activity may be considered a single gesture (e.g., a swipe, hold, and reposition gesture) or may be considered a combination of gestures (e.g., a swipe and hold gesture followed by a slow moving screen press). A swipe, hold, and reposition input of this type is depicted in FIG. 10. In particular, FIG. 10 shows how a user may make a gesture input that is formed from a combination of tap point 101, swipe motion 102, hold point 103, delay time 104, second swipe (or repositioning) motion 105, and hold point 106. A user may start by placing their finger at tap point 101. The user may then drag their finger in swipe motion 102 across touch screen display 34, may hold their finger at point 103, may wait for a user-determined period of time that is represented by dashed line 104 (and which does not represent actual movement of the user's finger), may drag their finger in a swipe motion 105 across the touch screen display 34, and may hold their finger at hold point 106.

As with other gestures, the type of action that media system 14 performs in response to a swipe, hold, and reposition gesture may depend on the attributes of the gesture (e.g., direction, speed, initial position, length of swipe, ending position, etc.) For example, swipe, hold, and reposition gestures may be performed with an initial swipe motion 102 in an upward, downward, rightward, or leftward direction as well as any direction in between. Furthermore, swipe, hold, and reposition gestures may generate different user inputs based on the direction of the second swipe motion 105 relative to the first swipe motion 102. For example, second swipe motion 105 may be performed in the same direction, opposite direction, or perpendicular directions to the first swipe motion 102 as well as any direction in between.

Figure 11:
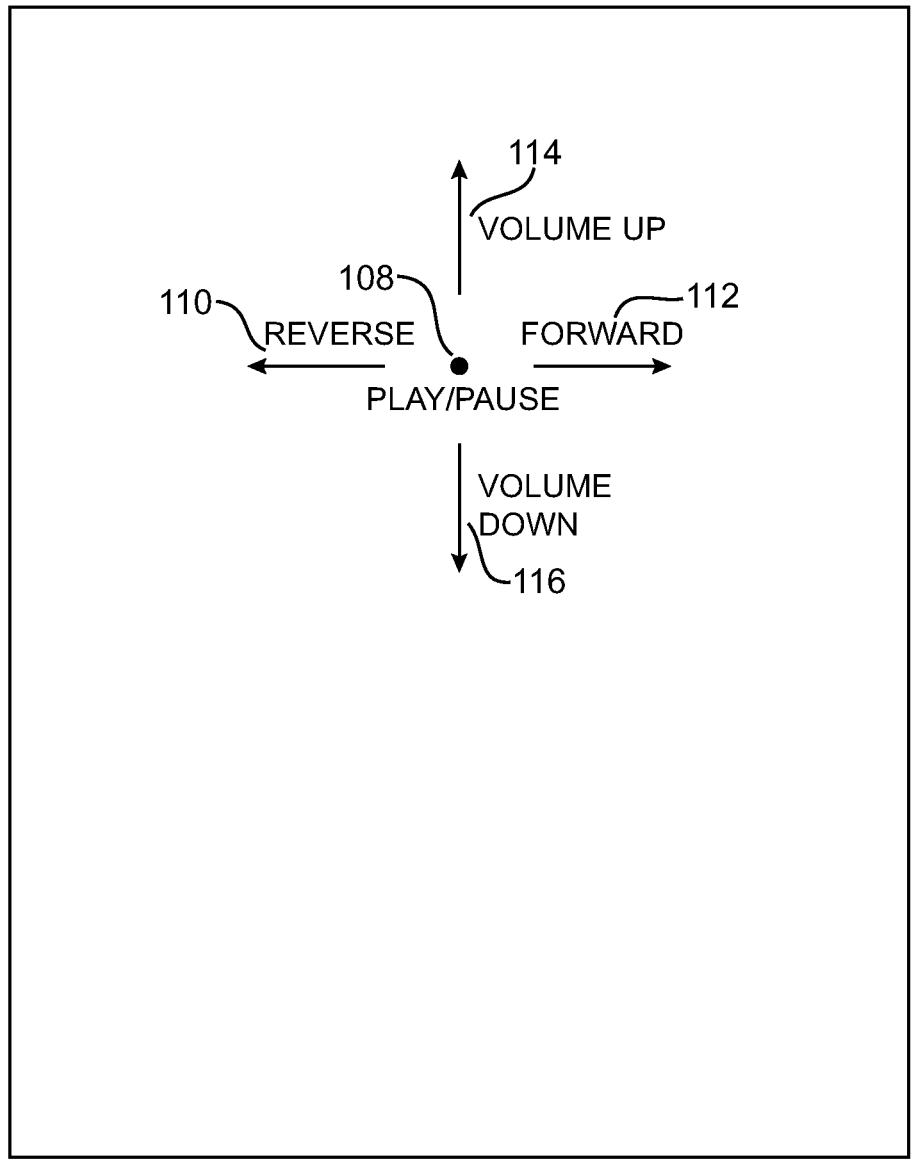
FIG. 11 shows illustrative media system remote control gestures that may be used to control system volume and media playback in a media system in accordance with an embodiment of the present invention.

FIG. 11 is an illustration of media system user inputs that may result from input to user device 12. The media system user inputs may be generated by the gesture inputs shown in FIG. 10 such as tap, swipe, swipe and hold, and swipe, hold, and reposition gestures. In the embodiment of FIG. 11, the user device 12 may be remotely controlling media system 14 while media system 14 is performing media playback operations such as video (potentially including its accompanying audio track), audio, or slideshow playback operations. User device 12 may generate media system user inputs from input gestures and then transmit the media system user inputs to media system 14 through path 20 or through path 21, communications network 16, and path 17.

A tap gesture performed by a user on user device 12 may generate a play/pause command 108. The play/pause command 108 may correspond to a play/pause remote control input sent to media system 14 by user device 12 that causes media system 14 to play or pause media playback from a media application (e.g., a media player application). Media system 14 may be able to perform a pause function whenever the media playback application is playing a media item and a play function whenever the media playback application is paused, stopped, in a fast forward or rewind mode, or is in a slow motion mode. In another embodiment, media system 14 may be able to perform a pause function instead of a play function whenever the media playback application is in a fast forward or rewind mode, or is in a slow motion mode.

A reverse command 110 may be generated when a user makes a leftward swipe gesture such as a tap followed by a leftward swipe. In one embodiment, the leftward swipe gesture may generate a reverse command 110 that causes media system 14 to enter a rewind mode during media playback. In another embodiment, the leftward swipe gesture may generate a reverse command 112 that causes media system 14 to skip backward during media playback. For example, the skip backward feature may skip back to a point such as the beginning of the current or the previous chapter, section, or title.

A forward command 112 may be generated when a user performs a rightward swipe gesture such as a tap followed by a rightward swipe. In one embodiment, the rightward swipe gesture may generate a forward command 112 that causes media system 14 to enter a fast forwarding mode during media playback. In another embodiment, the rightward swipe gesture may generate a forward command 112 that causes media system 14 to skip forward during media playback. For example, the skip forward feature may skip forward to a point such as the next chapter, section, or title. If a user is listening to a song, the rightward swipe may instruct the media system to advance to the next song in a playlist (as an example).

Volume up command 114 may be generated when a user performs an upward swipe gesture (e.g., a tap followed by an upward swiping motion). In one embodiment, the upward swipe gesture may generate a volume up command such as command 114 that causes media system 14 to increase the volume by one volume increment.

Volume down command 116 may be generated when a user performs a downward swipe gesture such as a tap followed by a downward swipe. In one embodiment, the downward swipe gesture may generate a volume down command such as command 116 that causes media system 14 to decrease the volume by one unit.

Audio volume is merely one example of a media system parameter that may be adjusted using swipe gestures. Other parameters that may be adjusted in this way include display brightness, display contrast, hue settings, advanced audio settings such as bass and treble settings (or more granular equalizer settings), etc.

When media system 14 is presenting a user with a group of items, swipe commands may be used to select among the items. The group of items may be, for example, a list of menu items, a group of icons each representing a respective menu item, a text-based list or icon-based representation of a group of songs, videos, or other media items, etc.

Figure 12:
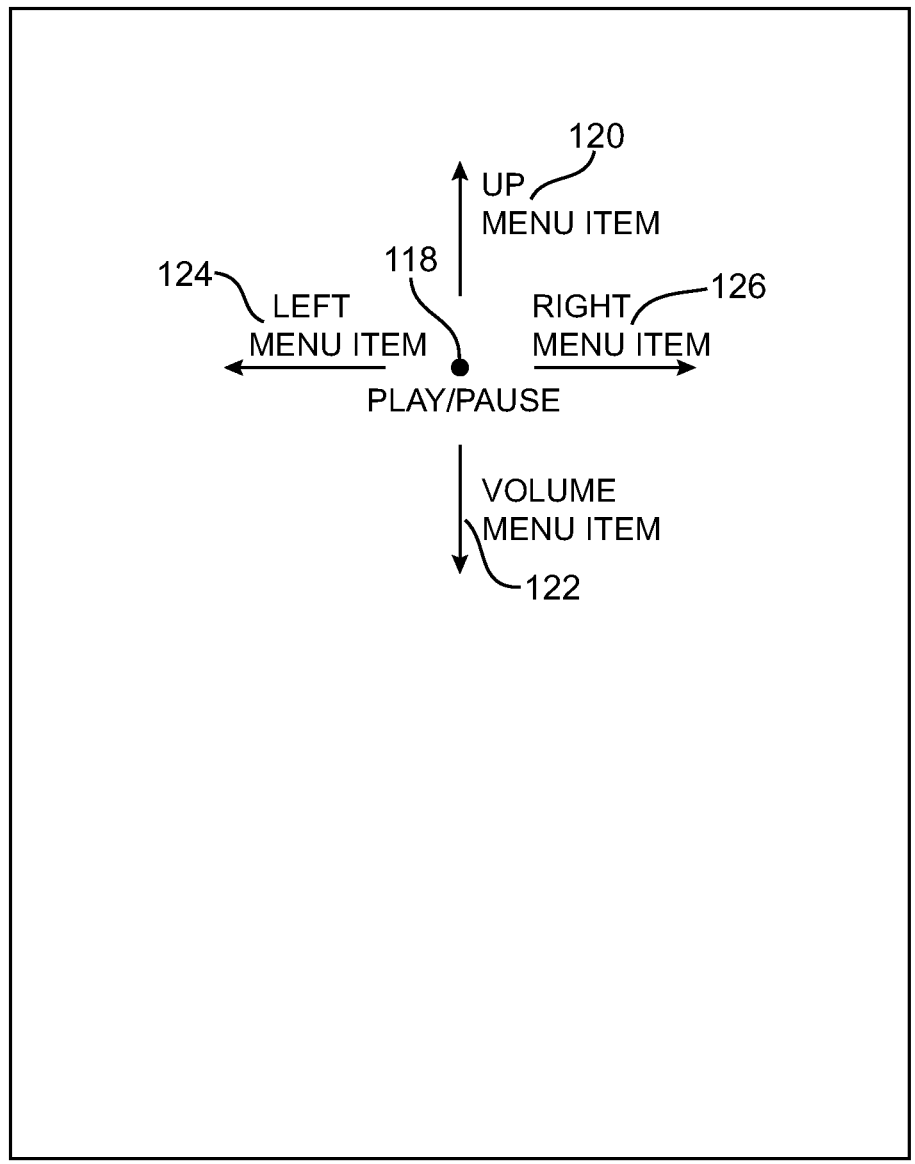
FIG. 12 shows illustrative menu control user inputs to a media system resulting from input gestures that may be performed by a user in accordance with an embodiment of the present invention.

FIG. 12 is an illustration of media system user input commands that may result from gestures made on the touch screen of user device 12 when controlling a media system function that involves a set of menu items. In general, media system commands may be generated by any suitable gestures such as tap gestures, swipe gestures, swipe and hold gestures, and swipe-hold-reposition gestures. In the example of FIG. 12, user device 12 may be remotely controlling media system 14 to navigate a menu of options or other items in a list or other on-screen group of items. User device 12 may generate media system user inputs from input gestures. Device 12 may then transmit the media system user inputs to media system 14 through path 20 or through path 21, communications network 16, and path 17.

A tap gesture performed by a user on user device 12 may generate a select command such as select command 118. The select command may cause media system 14 to select a currently highlighted menu item from a group of menu items that are being displayed for the user on media system 14. Displayed items may be highlighted using any suitable highlighting technique. For example, one or more items may be highlighted (e.g., by surrounding a text item with a box, presenting a highlighted item in a larger or more visible font, enlarging, animating or otherwise visually accentuating a given item, rotating items so that one of the items appears in a particularly prominent location on the screen, etc.

As an example, when browsing a digital video disc (DVD) menu, an item may be highlighted by surrounding that item with a box. A user may use a gesture such as select command 118 to select the highlighted item. Items that may be selected in this way include chapter locations, playback commands such as play, etc. With this type of arrangement, gesture-based select command 118 may be used to perform functions such as opening the chapters section of the DVD or opening the extras section of the DVD. If the user taps the screen to make a select gesture when a play option has been highlighted, the select gesture will direct the media system to initiate media playback to play the DVD.

An up menu item command such as command 120 may be generated when a user performs an upward swipe gesture such as a tap followed by an upward swipe. The upward swipe gesture may generate an up menu item command such as command 120 that causes media system 14 to navigate to a previous on-screen item (e.g., a previous menu item) by scrolling in the upward direction among displayed menu items.

If desired, swipe and hold gestures may result in functionality that might otherwise be obtained by making multiple swipe gestures. For example, a user may adjust a media system parameter such as playback volume using four successive up swipes or may make a swipe and hold gesture in which the hold time is sufficient to allow the media system to adjust the volume upwards by four volume increments. This same type of functionality may be used to control the highlighting and selection of displayed items.

For example, when media system 14 is displaying a list of items such as menu items, a repeating up menu item command may be generated when a user performs an upward swipe and hold gesture. The upward swipe and hold gesture may generate an up menu item command such as command 120 of FIG. 12 that causes media system 14 to navigate to a previous menu item. In this situation, a highlight region in the displayed menu items may be moved appropriately. For example, in a list of menu items, a highlight region may be moved upwards to previous menu items in the list scrolling the highlight region in the upward direction until a user lifts their finger from the touch screen.

Similarly, downward swipes may be used to navigate to successive items in a list or other group on a display. For example, a down menu item command such as command 122 may be generated when a user performs a downward swipe gesture. The downward swipe gesture may cause the media system to highlight the next item in a list or other group of displayed items. In a list format, a highlight in the list may be moved to the next displayed item or the list may be scrolled upwards by one increment in response to the downward swipe.

As with other swipe and hold gestures, a downward swipe and hold gesture may direct media system 14 to perform the downward swipe and hold action multiple times. For example, the downward swipe and hold gesture may generate a down menu item command such as command 122 of FIG. 12. This command may cause media system 14 to navigate downwards through multiple items in a list. Navigation may be performed by moving a highlight region in the list down by multiple list item increments or by scrolling the list upwards by multiple increments. Navigation for a downwards swipe and hold gesture and other swipe and hold gestures can continue until the user lifts their finger from its hold point on the touch screen display. Alternatively, navigation operations may be performed for an amount of time that is proportional to the amount of time for which the user held on the hold point following the swipe motion.

A left swipe gesture may be used to move to the left in an on-screen list of items. For example, in a graphical list of items, a left swipe may be used to move to an item that is to the left of the currently highlighted item. When menu items are displayed on media system 14, a leftward swipe gesture may generate a left menu item command 124 that causes media system 14 to navigate to the left by one item in a menu of items. If a particular menu item is highlighted, for example, the leftward swipe may direct the media system to move a highlight region to the left by a single increment. If desired, a leftward swipe gesture may direct the media system to scroll a list to the right (while a highlight region in the list remains at a constant position).

A leftward swipe and hold gesture may be used to perform multiple operations of the type associated with a single leftward swipe gesture. For example, a leftward swipe and hold gesture may direct media system 14 to move a highlight region multiple items to the left in a list of on-screen items (i.e., multiple left menu item commands 124).

A rightward swipe gesture may be used to move to the right in a list of on-screen items. For example, a rightward swipe gesture may be used to move a highlight region to the right in a group of items or may be used to scroll a list of items one space to the left while a highlight in the list remains stationary. When the group of displayed items is a group of menu items, the rightward swipe gesture may be used as a right menu item command as shown by right menu item command 126 in FIG. 12.

When a user makes a rightward swipe and hold gesture, media system 14 may take multiple actions of the type that would otherwise be taken when the user makes a single rightward swipe. For example, a rightward swipe and hold operation may direct the media system to move a highlight in an on-screen group of items multiple places to the right or may direct the media system to scroll an on-screen group of items multiple places to the left while a highlight in the group of items remains in a stationary position.

If desired, device 12 may display confirmatory information on display 34 whenever a gesture is made. Confirmatory information may be presented to the user as soon as device 12 recognizes a gesture or may be displayed after device 12 has transmitted a gesture command to media system 14 and has received corresponding status information (e.g., information indicating that a system parameter has been successfully adjusted, information indicating that a highlight region has been moved to highlight a particular on-screen item, information indicating that the command was received successfully, etc.).

The confirmatory information may be presented in any suitable format including video, audio, text, and graphics. Media system 14 may or may not display confirmatory information. For example, if a user is controlling the volume of media system 14, media system 14 may or may not display information regarding volume adjustments that are made using gestures.

An example of audio confirmatory information that may be presented is a tone or sound clip. An example of text-based confirmatory information is a phrase such as "volume increased." Graphics-based confirmatory information may be presented in the form of still or moving (animated) graphics items.

Figure 13:
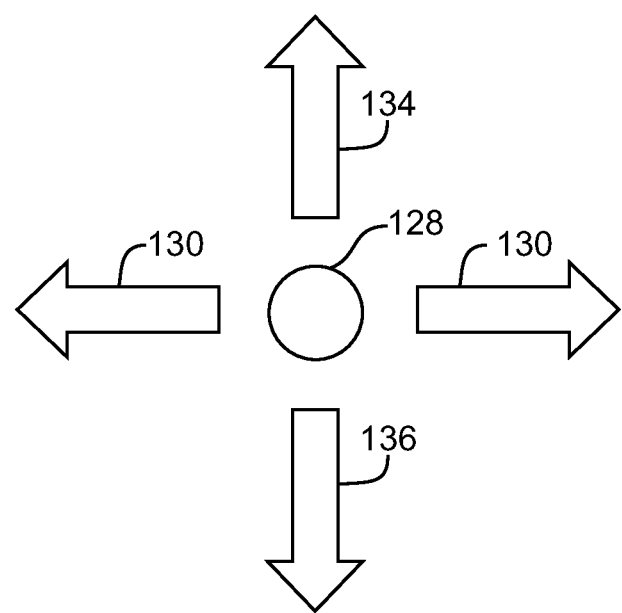
FIG. 13 shows illustrative confirmatory on-screen display objects that may be presented to a user by a handheld electronic device on which remote control functionality has been implemented in accordance with an embodiment of the present invention.

FIG. 13 shows illustrative graphics-based confirmatory information that may be displayed on touch screen 34 of user device 12 when a user makes gestures such as a tap, and leftward, rightward, upward, and downward swipes. When a user taps on device 12, a tap confirmation such as tap confirmation 128 may be displayed. Left, right, up, and down swipes may be confirmed by displaying arrows 130, 132, 134, and 136, respectively. These graphical items serve as a visual acknowledgement that an input gesture from a user has been received. It is not necessary for the confirmatory information to be representative of the gesture command that has been received. For example, a generic icon may be displayed whenever any gesture is received. Preferably, however, the confirmatory information that is presented to the user is representative of the gesture or is unique to that gesture.

As shown in the example of FIG. 13, a circle or other graphical element 128 may be presented to a user following a tap gesture. An arrow 130 may be presented to a user following a leftward swipe gesture, a leftward swipe and hold gesture, or a leftward first swipe (e.g., swipe 102 of FIG. 10) or second (repositioning) swipe (e.g., repositioning movement 105 of FIG. 10) in a swipe, hold, and reposition gesture. An arrow 132 may be presented to a user following a rightward swipe gesture, a rightward swipe and hold gesture, or a rightward first swipe (e.g., swipe 102) or second swipe (e.g., repositioning movement 105) in a swipe, hold, and reposition gesture. An arrow 134 may be presented to a user following an upward swipe gesture, an upward swipe and hold gesture, or an upward first swipe (e.g., swipe 102) or second swipe (e.g., repositioning movement 105) in a swipe, hold, and reposition gesture. An arrow 136 may be presented to a user following a downward swipe gesture, a downward swipe and hold gesture, or a downward first swipe (e.g., swipe 102) or second swipe (e.g., repositioning movement 105) in a swipe, hold, and reposition gesture.

Confirmatory information such as tap confirmation icon 128 and swipe confirmation icons such as arrows 130, 132, 134, and 136 may be displayed on display screen 34 persistently (i.e., until a subsequent input gesture is made or other action is taken) or may be displayed on display screen 34 momentarily (i.e., so that the confirmatory information fades away after a few seconds or other suitable time interval). After the confirmatory information is removed, display screen 34 may be blank or may return to its previous state.

While status information 138 or other confirmatory information is displayed for the user on touch screen display 34 of user device 12, corresponding status information or other confirmatory information may be displayed for the user on a display in media system 14. For example, if a user makes an upward swipe gesture to increase the volume of a song when a song is being played back using a media playback application on the media system, confirmatory information such as an upward arrow, plus sign, or volume bar readout, may be displayed on user device 12. At the same time, the media playback application may display (momentarily or persistently) a volume indicator icon. The volume information that is displayed on the media system by the playback application need not be displayed in the same way as the volume information that is displayed on the user device. For example, the user device may display confirmatory information that indicates to the user (e.g., in the user's peripheral vision) that an upwards swipe has been registered, whereas the media system may display a more detailed volume status indicator that includes information on the actual current system volume. As another example, the user device may be used to display a volume status bar, whereas the media system application may display a volume slider. Yet another example involves a media system component that does not display (or that does not completely display) information on the system parameter that is being adjusted. In this type of scenario, the user device may display more information on the adjusted system parameter than the media system. The user device may, as an example, display a current volume status bar, while no volume level information is displayed by the media system.

Any suitable types of confirmatory information icons may be used to confirm to the user when gestures have been made. For example, when a user moves an item through a list, confirmatory arrow icons may be displayed to indicate the direction of navigation through the list. When a user fast forwards or reverses through a media item that is being presented to the user (e.g., using a media playback application), a confirmatory forward or backward icon may be displayed to indicate to the user that the fast forward or reverse gesture has been properly processed. When a user increases or decreases a system parameter, plus and minus icons may be displayed.

In general, the type of confirmatory information that is displayed on user device 12 may be based on the current status of the media system. If, for example, the user is navigating through a list of media items and selects a desired media item to obtain more information on that item, a confirmatory icon such as a tap or select confirmation icon may be displayed. If a media system remote control gesture (such as a select gesture) is made that directs the media system to play a particular media item, confirmatory information may be displayed on the user device in the form of a play icon. Graphics or other types of confirmatory information may be presented for other media playback actions if desired. For example, confirmatory information may be displayed in the form of a pause icon, a rewind icon, a fast forward icon, a stop icon, etc. When a user is changing channels on a television, the confirmatory information may be presented in the form of plus and minus icons to indicate that a television channel setting on the media system has been incremented or decremented. Icons such as these may be personalized for different components in system 14. For example, a plus or minus channel icon may be presented in one color when a television channel is being adjusted and may be presented in a different color when a radio tuner channel is being adjusted.

Figure 14:
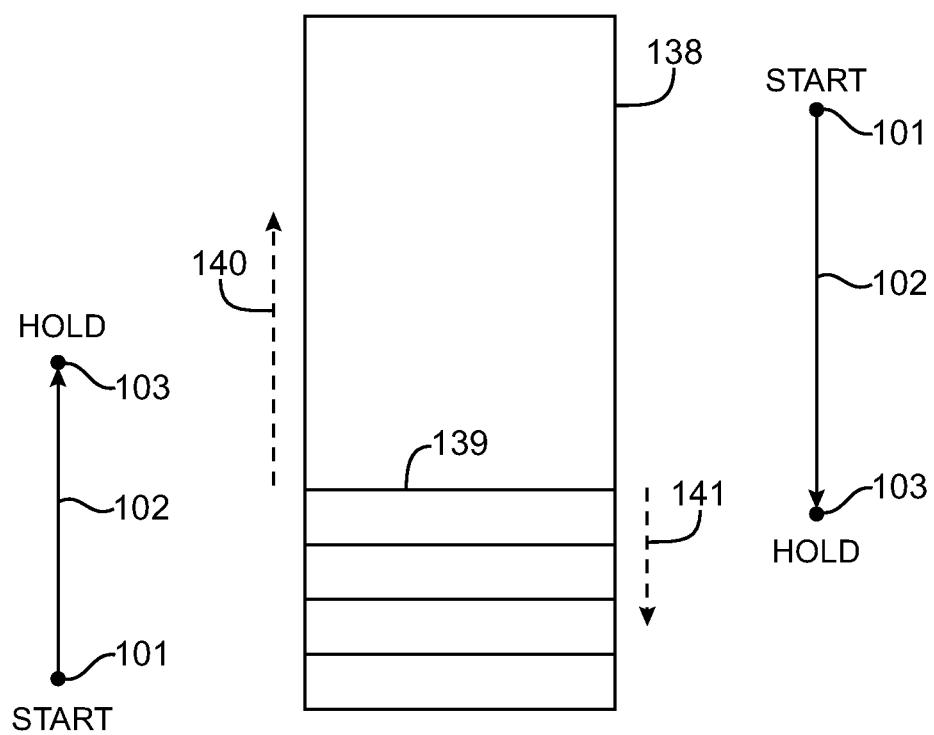
FIG. 14 shows illustrative on screen information (display objects) that may be presented to a user by a handheld electronic device on which a remote control has been implemented and shows illustrative user inputs to a media system resulting from input gestures that may be performed by a user in accordance with an embodiment of the present invention.

If desired, similar icons may be displayed for similar actions. For example, an up arrow may be used when moving an on-screen highlight up one position in a list in response to a media system remote control gesture such as an upwards swipe, whereas a bold version of the same up arrow may be used when moving the on-screen highlight up multiple positions in response to an upwards swipe an hold gesture. These examples of confirmatory information that may be displayed are merely illustrative. In particular, the use of the confirmatory shapes of FIG. 13 and the confirmatory status information readout of FIG. 14 are just illustrative of some of the ways in which confirmatory information may be presented to a user of user device 12 when media system remote control gestures are made and when status information from the media system 14 is received by the user device. Confirmatory information may be displayed on user device 12 using any suitable format either in synchronization with the simultaneous display of the same information or related information on a display screen in media system 14 or independently from the display of related information in media system 14.

FIG. 14 shows illustrative confirmatory status information 138 that may be presented to a user to provide visual feedback when a media system remote control gesture from a user has been used to control a system parameter in media system 14. Status information 138 may be displayed to provide a user with information on a volume level adjustment, brightness level adjustment, or other suitable parameter adjustment in media system 14.

FIG. 14 also shows illustrative input gestures that may be made by a user on user device 12 to generate media system commands. User device 12 may generate media system commands in response to input gestures and may transmit the commands to media system 14 through path 20 or through path 21, communications network 16, and path 17.

In the example of FIG. 14, a swipe and hold gesture is illustrated by start point 101, swipe motion 102, and hold position 103. The swipe and hold gesture may be performed in either an upward or a downward direction.

Status information 138 may represent the current state of a parameter such as volume, brightness, contrast, etc. in media system 14. Media system 14 may communicate its current state back to user device 12 so that current level 139 of status information 138 matches the state of media system 14. For example, if the volume of media system 14 is three out on a scale of one to ten, then level 139 may be at the third level of a ten level scale.

When an upward swipe and hold gesture is performed on user device 12, user device 12 may generate a media system user input that increases the value of a parameter in media system 14. For example, the upward swipe and hold gesture may increase the level 139 as indicated by the dashed line 140. With one suitable arrangement, the media system parameter and the corresponding level 139 in status information 138 may increase incrementally at a fixed rate in response to an upward swipe and hold gesture until hold operation 103 is terminated by a user lifting their finger from touch screen display 34. If desired, the upward movement of level 139 (and the corresponding adjustment of the controlled parameter in media system 14) may continue uninterrupted until a maximum value is reached or until the user repositions hold position 103.

When an upward swipe gesture with no hold is made on user device 12, user device 12 may generate a media system user input that increments a media system parameter by one increment. For example, when a user performs an upward swipe gesture on user device 12, user device 12 may generate a media system user input that increases the volume in media system 14 by one unit.

When a downward swipe and hold gesture is performed on user device 12, user device 12 may generate a media system user input that decreases a media system parameter.

For example, the downward swipe and hold gesture may decrease level 139 and a corresponding parameter setting in media system 14 as indicated by dashed line 141. The downward swipe and hold gesture may cause a parameter in media system 14 to be decreased incrementally at a fixed rate until hold operation 103 is terminated by a user (i.e., when the user has lifted their finger from touch screen display 34).

When a downward swipe gesture, with no hold, is performed on user device 12, user device 12 may generate a media system user input that increments a media system parameter by one increment. For example, when a user performs a downward swipe gesture on user device 12, user device 12 may direct media system 14 to lower the volume in media system 14 by one unit.

If desired, the adjustment of media system parameters and the corresponding adjustment of the level of media system parameters that is represented in the status display on device 12 may be affected by the user's repositioning of the hold point in a swipe and hold operation.

Figure 15:
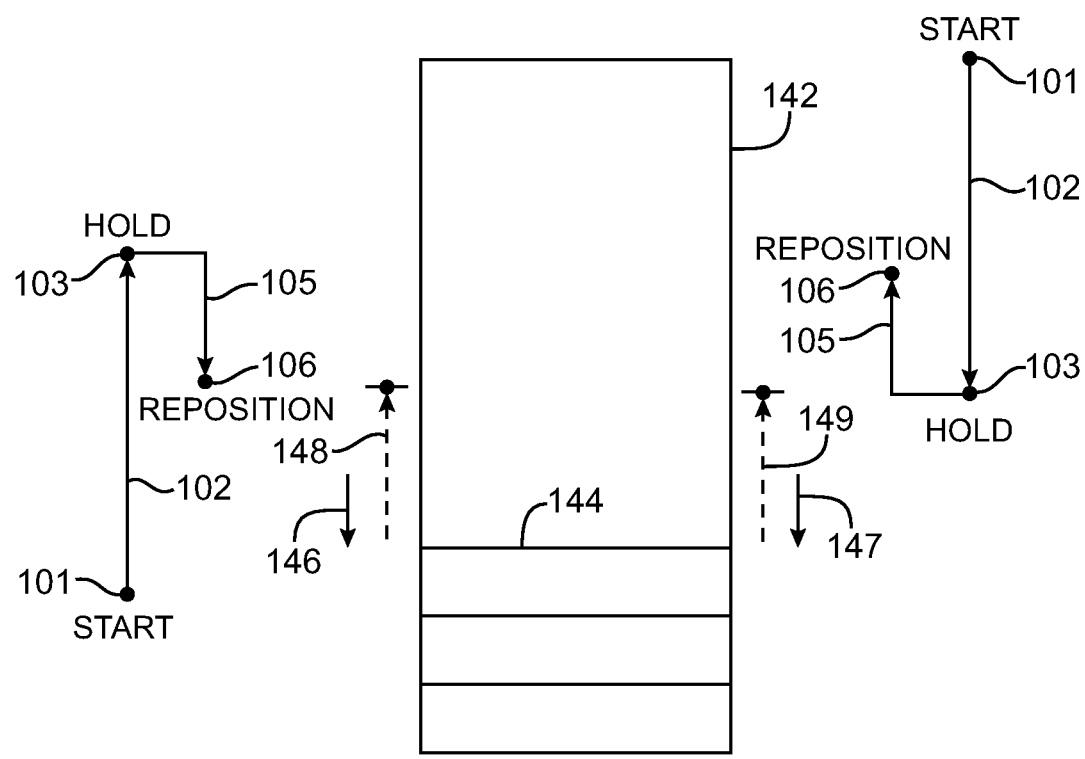
FIG. 15 shows additional illustrative display objects that may be presented to a user by a remote control device and illustrative user inputs to a media system resulting from input gestures that may be performed by a user in accordance with an embodiment of the present invention.

FIG. 15 shows illustrative status information 142 that may be presented to a user to provide visual feedback that an input gesture from a user is controlling media system 14. In the example of FIG. 15, a user has made an illustrative upward swipe, hold, and reposition gesture and has made an illustrative downward swipe, hold, and reposition gesture.

A swipe and hold and a swipe, hold, and reposition gesture are illustrated by start point 101, first swipe motion 102, hold position 103, second swipe motion 105, and hold position 106. The swipe and hold gesture may be performed with either an upward or downward swipe motion 102. The swipe, hold, and reposition gesture may be performed with either an upward or downward first swipe motion 102, and the second swipe motion 105 may be either upward or downward regardless of the direction of the first swipe motion 102.

Status information display 142 may show the current state of a setting such as volume, brightness, contrast, etc. in media system 14. Media system 14 may communicate its current state to user device 12 so that the level 144 of status information 142 matches the state of media system 14. For example, if the volume of media system 14 is three on a scale of one to ten, then level 144 may be at the third level of a ten level scale.

When an upward swipe and hold gesture is performed on user device 12, user device 12 may generate a media system user input that increases a value of an appropriate parameter setting in media system 14 For example, the upward swipe and hold may increase level 144 as indicated by the line 146. The increase may continue until the user either removes the input or performs a second swipe (e.g., a reposition). In another example, the upward swipe and hold gesture may increase level 144 until level 144 matches hold position 103.

If desired, when an upward swipe, hold, and reposition gesture is performed on user device 12, user device 12 may generate a media system user input that increases a value of a state in media system 14 in a relative manner. For example, when the direction of the first swipe 102 is upward and the second swipe 105 is downward, user device 12 may generate a media system user input that causes the level 144 of the state 142 to increase or decrease such that the level 144 heads towards hold position 106 as indicated by the dashed line 148.

When a downward swipe and hold gesture is performed on user device 12, user device 12 may generate a media system user input that decreases a media system parameter. For example, the downward swipe and hold may decrease level 144 as indicated by the line 147. The decrease may continue until the user either removes the input or performs a second swipe (e.g., a reposition). In another example, the upward swipe and hold may increase the level 144 until the level 144 matches hold position 103.

When a downward swipe, hold, and reposition gesture is made by the user, device 12 and media system 14 may behave similarly. For example, when the direction of the first swipe 102 is downward and the second swipe 105 is upward, user device 12 may increase or decrease the level 144 of the parameter that is being adjusted so that the level 144 is adjusted towards hold position 106 as indicated by the dashed line 149.

Figure 16:
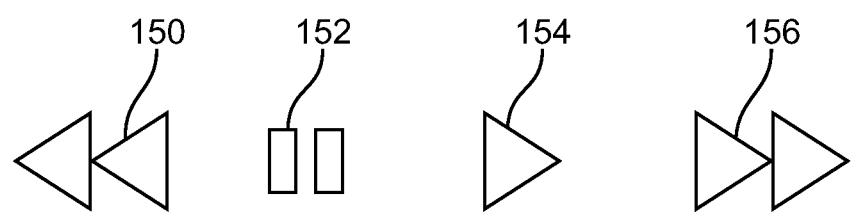
FIG. 16 shows illustrative on-screen confirmatory display objects that may be presented to a user by a handheld electronic device with remote control functions in accordance with an embodiment of the present invention.

FIG. 16 shows confirmatory information in the form of graphical icons 150, 152, 154, and 156 that may be presented to a user to provide a visual acknowledgement that a media system remote control gesture from a user has been received by user device 12. Icons 152 and 154 may be presented to a user following tap gestures. For example, when a tap gesture corresponds to play command 108 (FIG. 11), user device 12 may present a user with confirmatory play icon 154. When the tap gesture is used to issue a remote control pause command such as pause command 108 of FIG. 11, user device 12 may present the user with confirmatory pause icon 152.

A double arrow rewind icon 150 may be presented to a user following a leftward swipe gesture, a leftward swipe and hold gesture, or a leftward first swipe 102 or second swipe 105 of a swipe, hold, and reposition gesture. For example, when a swipe, swipe and hold, or swipe, hold, and reposition gesture corresponds to a reverse command such as reverse command 108, user device 12 may present a user with icon 150.

A double arrow fast forward icon 156 may be presented to a user following a rightward swipe gesture, a rightward swipe and hold gesture, or a rightward first swipe 102 or second swipe 105 of a swipe, hold, and reposition gesture. For example, when a swipe, swipe and hold, or swipe, hold, and reposition gesture corresponds to a forward command such as forward command 114, user device 12 may present a user with confirmatory icon 156.

Icons 150, 152, 154, and 156 may be displayed to a user on display screen 34 of user device 12 until a subsequent input is performed or may fade away with time. For example, icons 150, 152, 154, and 156 may appear on display screen 34 after a user performs an input gesture such as a tap, swipe, swipe and hold, or swipe, hold, and reposition gesture and may then may fade away after a few seconds leaving display screen 34 either blank or in its previous state.

Figure 17:
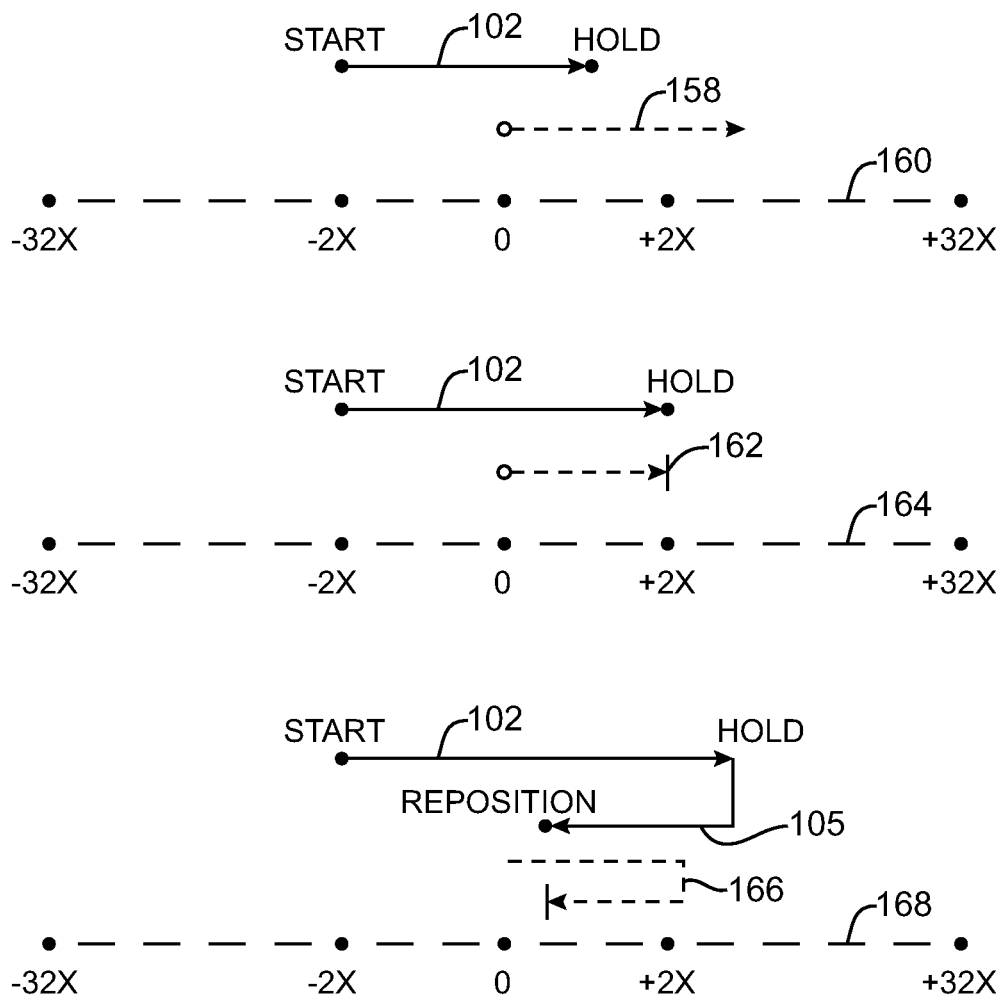
FIG. 17 shows illustrative media system remote control gestures and resulting on-screen confirmatory display items that may be presented to a user of a handheld electronic device in which remote control functionality has been implemented in accordance with an embodiment of the present invention.

Illustrative confirmatory status information 160, 164, and 168 that a user device may present to a user when the user is controlling the playback of a media item such as a video is shown in FIG. 17. When a user makes a swipe and hold gesture or a swipe, hold, and reposition gesture, confirmatory information 160, 164, or 168 may appear on display screen 34 of user device 12. In the examples and description of FIG. 17 below, a fast forward mode and rightward gestures are described. A rewind mode, pause mode, and leftward gestures may be also performed in the manner described below. A slow motion mode may be considered to be a slower version of a rewind or fast forward mode.

When a user makes a swipe and hold media system remote control gesture, user device 12 may generate corresponding remote control command information for media system 14, as represented by dashed lines 158 and 162. In response, user device 12 may present the user with confirmatory information 160 or 164 on display screen 34.

In the arrangement illustrated in the upper portion of FIG. 17, a swipe and hold gesture that includes swipe 102 may generate remote control command information 158. The dashed line for remote control command information 158 represents remote control command information for media system 14 that causes media system 14 to enter a fast forward mode. Remote control command information 158 may cause the fast forward mode to increase incrementally in speed at a constant rate. The increase in fast forward mode speed may continue until a limit is reached such as the fastest mode supported (e.g., +32×). The increase in fast forward mode speed may continue until a user terminates the hold portion of the swipe and hold gesture.

In the alternative arrangement illustrated in the middle portion of FIG. 17, a swipe and hold gesture that includes swipe 102 may generate remote control command information 162. The dashed line for remote control command information 162 represents remote control command information for media system 14 that causes media system 14 to enter a fast forward mode, as with the remote control command information 158. However, unlike the mode of operation described in connection with the upper portion of FIG. 17, in the mode of operation associated with the middle portion of FIG. 17, the swipe and hold remote control gesture may cause the fast forward mode to increase incrementally in speed at a constant rate until the speed of the fast forward operation matches the location of the hold position. For example, when the user's hold location coincides with the location of a speed (e.g., +2×) on the confirmatory status information 164 that is being presented on display screen 34 of user device 12, the remote control command information 162 may maintain that speed (e.g., +2×) for the media system. The fast forward mode may therefore remain at the relative speed selected by the user's chosen hold position until the user terminates the hold operation (e.g., removes their finger) or until another user input is received by user device 12 (e.g., a tap gesture to play or pause or a non-gesture input).

As shown in the lower portion of FIG. 17, when a user performs a swipe, hold, and reposition media system remote control gesture, user device 12 may generate media system remote control command information of the type illustrated by dashed line 166. The user may also be presented with confirmatory status information such as playback speed information 168 on display screen 34.

When a user makes a swipe, hold, and reposition gesture of the type shown in the lower portion of FIG. 17, media system remote control command information of the type illustrated by dashed line 166 may cause media system 14 to enter a fast forward mode. Remote control command information 166 may cause the fast forward playback operation on media system 14 to incrementally increase or decrease in speed at a given rate until the speed matches the location of the current hold position. For example, if the initial hold occurs above the +2× speed position on displayed confirmatory information 168 the fast forward speed of the media playback operation in media system 14 may increase until the fast forward speed matches the location of the initial hold. If the user's finger is repositioned as shown in FIG. 17, a subsequent hold position may be established at a slower fast forward speed, at zero (e.g., a pause position), or at a rewind speed. In response, user device 12 may generate remote control command information 166 to decrease the fast forward speed, to pause playback, or to reverse the playback direction as appropriate. The playback operation of the media system may steadily change as indicated by dashed line 166 until the fast forward or rewind speed matches the location of the current hold position.

Figure 18:
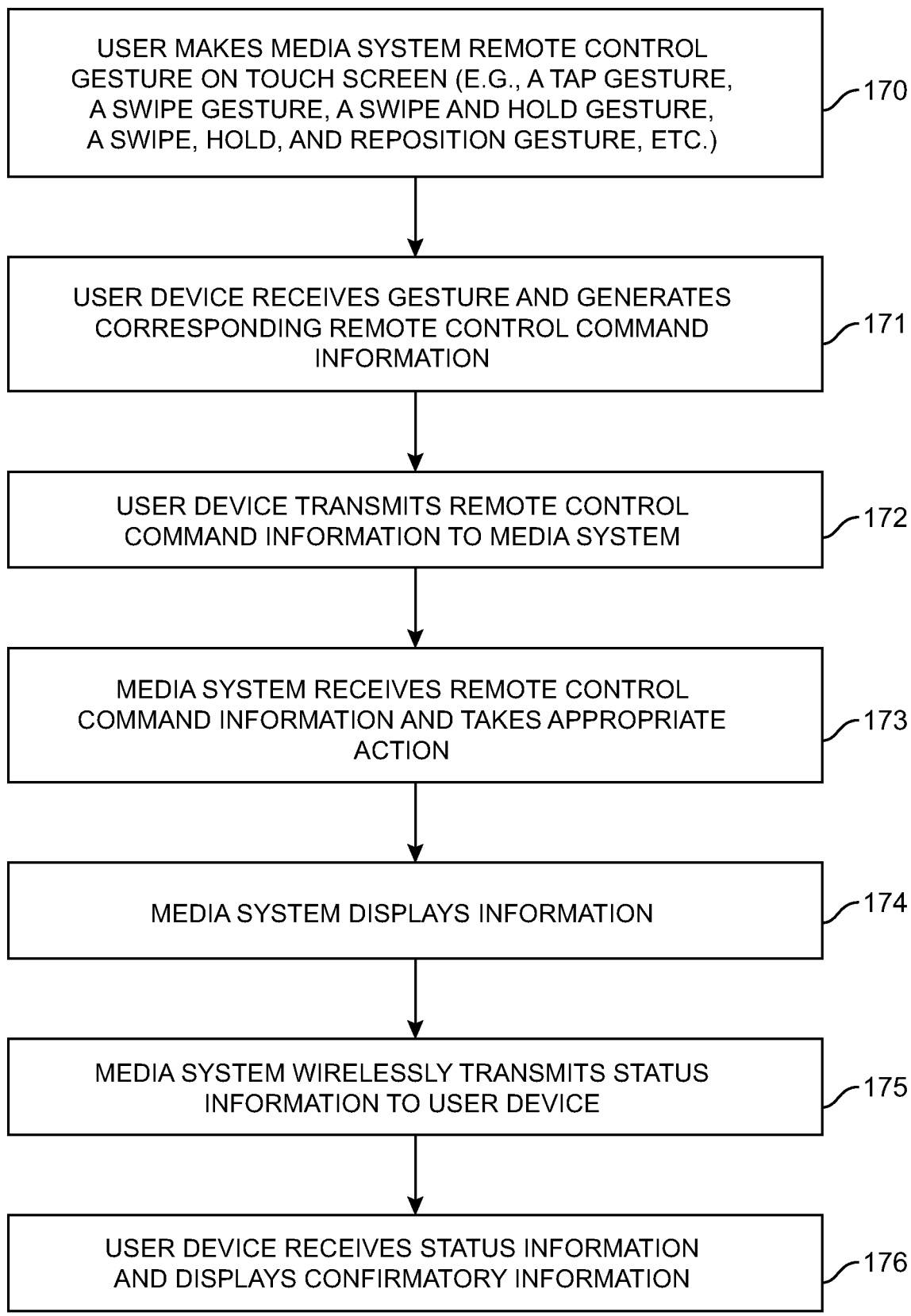
FIG. 18 is a flow chart of illustrative steps involved in using a handheld electronic device with a touch screen display to receive and process media system remote control gestures for a media system in accordance with an embodiment of the present invention.

Illustrative steps involved in using a system having a gesture-enabled user device and a media system are shown in FIG. 18.

At step 170, a user may make a media system remote control gesture on touch screen display 34 of user device 12. The gesture may include any suitable motions of one or more fingers (or pens, etc.) on the display. Examples of gestures include single and multiple tap gestures, swipe-based gestures, etc. The media system that is being controlled may have equipment such as a television, set-top box, television tuner equipment (e.g., stand-alone equipment or equipment in a television or set-top box), personal video recorder equipment (e.g., stand-alone equipment or equipment incorporated into a personal computer or cable or satellite set-top box), a personal computer, a streaming media device, etc. System parameters that may be controlled in this way may include volume levels (of components and media playback applications), display brightness levels, display contrast levels, audio equalization settings such as bass and treble levels, etc. Playback transport settings may also be controlled using gesture commands (e.g., to play, stop, pause, reverse, or fast-forward component that is playing a disc or other media or that is playing audio or video on a hard drive or other storage or that is playing audio or video from a streaming source, etc.).

If desired, a highlight region may be moved among an on-screen display of multiple items. The items that are displayed may be displayed as a list or other suitable group. The displayed items may be displayed using text (e.g., song or video names) or as icons (e.g., graphical menu items). Gestures may be used to navigate among the displayed items and to select items and perform appropriate actions (e.g., play, add to playlist, skip, delete, select, etc.)

At step 171, user device 12 may receive the media system remote control gesture. A processor in user device 12 may be used to process the received gesture to generate corresponding media system remote control command information.

At step 172, the remote control command information may be transmitted to media system 14 from user device 12 using any suitable protocol. With one suitable arrangement, wireless communications circuitry in device 12 is used to transmit radio-frequency signals using a local area network protocol such as the IEEE 802.11 protocol (Wi-Fi®). Other protocols that may be used include cellular telephone protocols (e.g., by way of the Internet), the Bluetooth® protocol, or infrared remote control protocols.

At step 173, equipment in media system 14 may receive the remote control command information and take an appropriate action. For example, if the remote control command includes a swipe command, the media system can increment or decrement a system parameter such as a system (or media playback application) volume, brightness, contrast, audio equalization setting, playback direction or speed, or television channel setting, or can move a highlight region's position within a group of on-screen items (e.g., a list of media items or a group of menu items, etc.). The actions that are taken in the media system in response to the remote control command information may be taken by one or more media system components. For example, in response to a channel up swipe gesture, a television tuner in a television, set-top box, personal computer, or other equipment in system 14 can increment its setting. In response to a volume up swipe, a television, audio-video receiver, or personal computer can adjust an associated volume level setting.

If desired, media system 14 may display status (state) information at step 174 that reflects the current status (state) of the hardware and/or software of system 14. The status information may include, for example, the current level of a volume setting, the current level of an audio equalization setting, the current playback direction and speed of a component in system 14 or a playback application in system 14, etc.

If desired, media system 14 can transmit status (state) information to user device 12 at step 175 in response to received media system remote control command information.

At step 176, user device 12 may receive any such transmitted status information. During step 176, the transmitted status information and other confirmatory information can be displayed for the user on device 12. If desired, the confirmatory information can be displayed on user device 12 in response to reception of the gesture at step 171. This provides a visual confirmation for the user that the gesture has been properly made. Illustrative confirmatory information that may be displayed includes arrows (e.g., to confirm a swipe gesture of a particular direction), transport commands (e.g., play, pause, forward, and reverse including playback speed information), on-screen navigation information (e.g., item up, item down, previous item, next item, or select commands), etc. The confirmatory information that is displayed on user device 12 may be based on the status information that is transmitted from media system 14. For example, the current volume setting or playback transport speed setting that is displayed on user device 12 may be based on status data received from media system 14. User device 12 may or may not display the same or associated status information that is displayed on a display screen in system 14. For example, if a media playback application is being controlled and a swipe gesture is used to increment a volume setting, user device 12 can display a confirmatory up icon at the same time that media system 14 displays a volume setting graphical indicator on a now playing screen. As another example, when a user makes a gesture to initiate playback of a media item, user device 12 can momentarily display a play icon while media system 14 may display a progress bar (momentarily or persistently).

Figure 19:
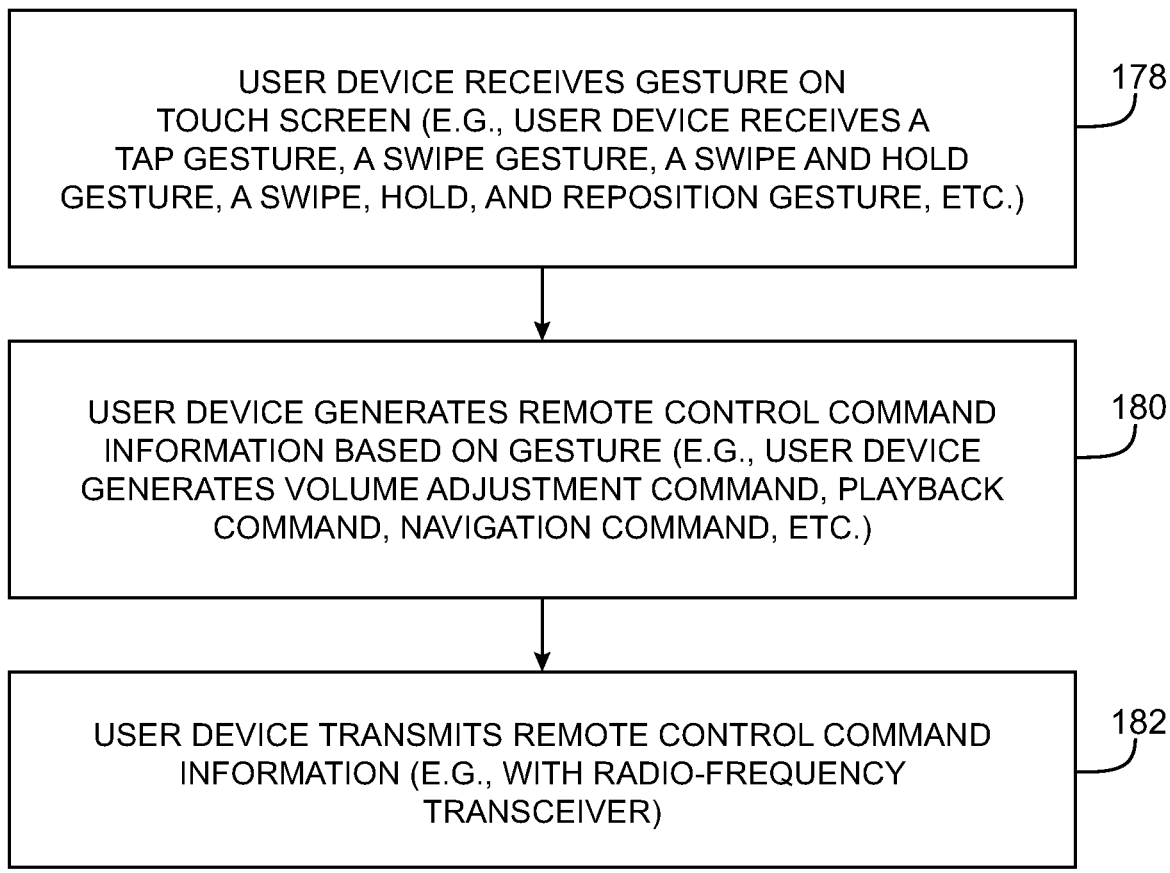
FIG. 19 is a flow chart of illustrative steps involved in using a handheld electronic device with a touch screen display to receive and process media system remote control gestures for a media system in accordance with an embodiment of the present invention.

Illustrative steps involved in using a gesture-enabled user device to remotely control a media system are shown in FIG. 19.

At step 178, user device 12 may receive a media system remote control gesture on touch screen display 34. The gesture may include any suitable motions of one or more fingers (or pens, etc.) on the display. Examples of gestures include single and multiple tap gestures, swipe-based gestures, etc.

At step 180, a processor in user device 12 may be used to process the received gesture to generate corresponding media system remote control command information. The media system remote control command information may correspond to remote control commands that remotely control media system parameters such as volume levels, display brightness levels, display contrast levels, audio equalization settings such as bass and treble levels, playback transport functions (e.g., play, stop, pause, reverse, or fast-forward), etc. The media system remote control command information may be used to navigate among an on-screen display of multiple items on media system 14 (e.g., by moving a highlight region among the displayed items).

At step 182, the remote control command information may be transmitted from user device 12 to media system 14 using any suitable protocol. For example, wireless communications circuitry in device 12 may be used to transmit radio-frequency signals using a local area network protocol such as the IEEE 802.11 protocol (Wi-Fi®). Other protocols that may be used include cellular telephone protocols (e.g., by way of the Internet), the Bluetooth® protocol, or infrared remote control protocols.

Figure 20:
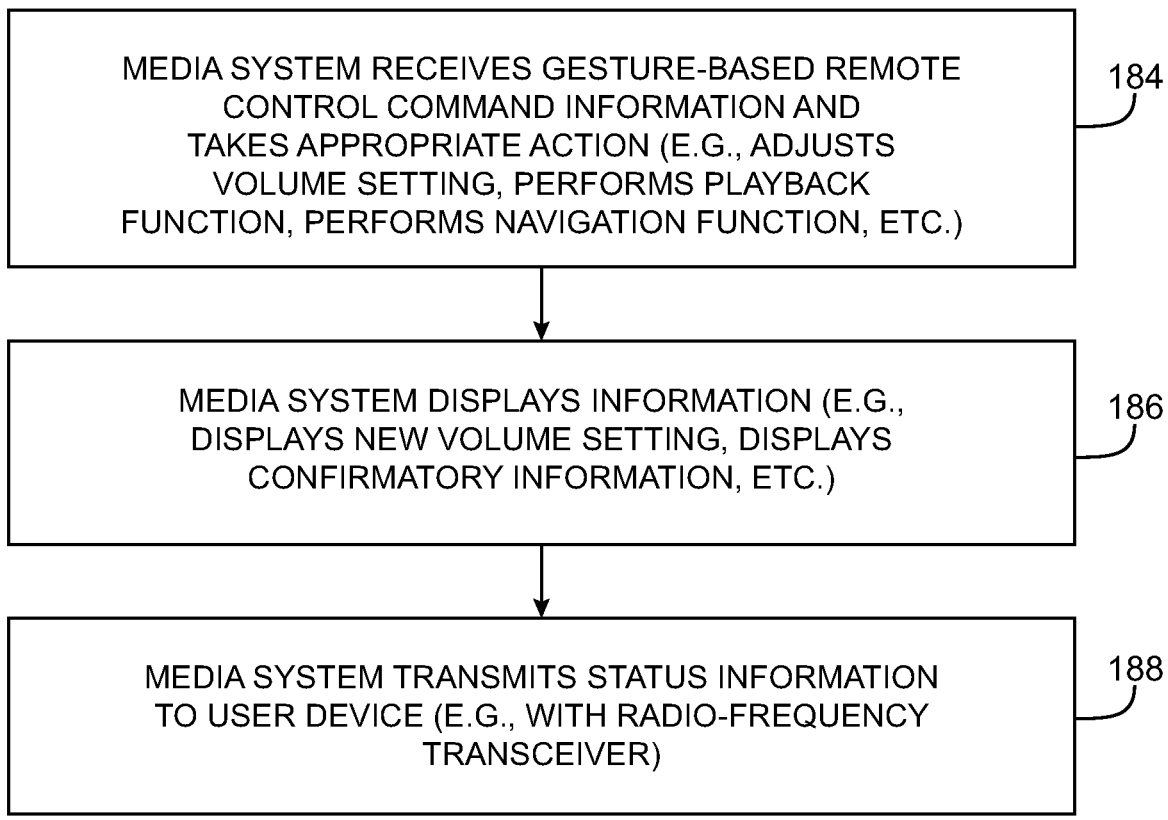
FIG. 20 is a flow chart of illustrative steps involved in using a media system to receive and process gesture-based media system remote control command information received from a handheld electronic device with a touch screen display in accordance with an embodiment of the present invention.

Illustrative steps involved in a using a media system to receive and process gesture-based media system remote control command information are shown in FIG. 20.

At step 184, equipment in media system 14 receives remote control command information and takes an appropriate action. For example, the media system can increment or decrement a system parameter such as a system (or media playback application) volume, brightness, contrast, audio equalization setting, or television channel setting, or can move a highlight region's position within a group of on-screen items (e.g., a list of media items or a group of menu items, etc.). The media system may perform playback transport functions (e.g., play, stop, pause, reverse, or fast-forward). The media system may navigate among an on-screen display.

Media system 14 may display status (state) information at step 186. The status information may include, for example, the current level of a volume setting, the current level of an audio equalization setting, the current playback direction and speed of a component in system 14 or a playback application in system 14, etc. If desired, the information displayed by media system 14 may be confirmatory information that provides a visual confirmation for the user that the gesture has been properly made. Illustrative confirmatory information that may be displayed includes arrows (e.g., to confirm a swipe gesture of a particular direction), transport commands (e.g., play, pause, forward, and reverse including playback speed information), on-screen navigation information (e.g., item up, item down, previous item, next item, or select commands), etc.

If desired, media system 14 can transmit status (state) information to user device 12 at step 188 using any suitable protocol. For example, wireless communications circuitry in system 14 may be used to transmit radio-frequency signals using a local area network protocol such as the IEEE 802.11 protocol (Wi-Fi®). Other protocols that may be used include cellular telephone protocols (e.g., by way of the Internet), the Bluetooth® protocol, or infrared remote control protocols. The status information may include the current volume setting or playback transport speed setting of system 14.

The foregoing is merely illustrative of the principles of this invention and various modifications can be made by those skilled in the art without departing from the scope and spirit of the invention.

What is claimed is:

1. A method of remotely controlling a media system using an electronic device, the method comprising:
   with a touch input surface in the electronic device, receiving remote control finger gestures, wherein receiving the remote control finger gestures comprises receiving a swipe gesture on the touch input surface;
   transmitting remote control command information to the media system based on the remote control finger gestures, wherein said transmitting the remote control command information comprises directing the media system to change a playback volume; and
   receiving status information from the media system in response to the remote control command information, wherein the received status information indicates the change in the playback volume.

2. The method defined in claim 1 wherein the touch input surface comprises a touch screen, the method further comprising:
displaying information on the touch screen that reflects the status information of the media system.

3. The method defined in claim 2 further comprising:
displaying an acknowledgement of each remote control gesture of the remote control finger gestures on the touch screen.

4. The method defined in claim 3 wherein said displaying the acknowledgement of each remote control gesture of the remote control finger gestures on the touch screen comprises displaying the acknowledgement at least partly based on the received status information.

5. The method defined in claim 2 wherein said transmitting the remote control command information further comprises directing the media system to adjust a highlight position within a displayed list of items.

6. The method defined in claim 5 further comprising:
directing the media system to select an item corresponding to the highlight position within the displayed list of items.

7. The method defined in claim 2 wherein said displaying the information on the touch screen comprises displaying the playback volume on the touch screen.

8. The method defined in claim 2 wherein said transmitting the remote control command information further comprises directing the media system to play back a media item.

9. The method defined in claim 8 wherein said displaying the information on the touch screen comprises displaying information that identifies the media item.

10. The method defined in claim 2 wherein said receiving the remote control finger gestures comprises receiving a tap gesture on the touch screen.

11. An electronic device configured to remotely control a media system, the electronic device comprising:
a touch input surface that is configured to receive remote control finger gestures including a swipe gesture;
processing circuitry that generates remote control command information based on the gestures, wherein the remote control command information is configured to direct the media system to play back a media item in response to some of the gestures, and wherein the remote control command information is configured to direct the media system to change a playback volume in response to the swipe gesture;
wireless communications circuitry that transmits the remote control command information to the media system,
wherein the wireless communications circuitry is configured to receive status information from the media system in response to the remote control command information and wherein the received status information identifies the media item and the playback volume; and
a display, wherein the display and the media system are configured to display information that reflects the received status information.

12. The electronic device defined in claim 11 wherein the display comprises a touch screen that is configured to present a visual acknowledgement of each remote control finger gesture of the remote control finger gestures.

13. The electronic device defined in claim 12 wherein the touch screen is configured to present the visual acknowledgement at least partly based on the received status information.

14. The electronic device defined in claim 11 wherein the wireless communication circuitry is configured to communicate over at least one cellular telephone communications band.

15. A method of wirelessly controlling a media system using an electronic device, the method comprising:
with a touch screen in the electronic device, receiving remote control finger gestures;
with wireless communications circuitry in the electronic device, transmitting media system remote control command information to the media system based on the gestures, wherein said transmitting the media system remote control command information comprises:
in response to a swipe gesture, said transmitting the media system remote control command information that directs the media system to change a playback volume; and
receiving status information from the media system in response to the media system remote control command information, wherein the received status information indicates the change in the playback volume.

16. The method defined in claim 15 wherein said transmitting the media system remote control Command information based on the remote control finger gestures further comprises:
in response to an additional swipe gesture, transmitting additional media system remote control command information that directs the media system to adjust a highlight position within a displayed list of items.

17. The method defined in claim 16 wherein said transmitting the media system remote control command information based on the gestures further comprises:
in response to a tap gesture, transmitting second additional media system remote control command information that directs the media system to play back a media item.

18. The method defined in claim 15 wherein the swipe gesture comprises a swipe up gesture and wherein said transmitting the media system remote control command information that directs the media system to change the playback volume comprises directing the media system to turn the playback volume up in response to the swipe up gesture.

19. The method defined in claim 18 wherein said transmitting the media system control command information based on the gestures further comprises:
in response to a swipe down gesture, transmitting additional media system remote control command information that directs the media system to turn the playback volume down.

* * * * *